US012652525B2

(12) United States Patent (10) Patent No.: US 12,652,525 B2
Wu (45) Date of Patent: Jun. 9, 2026

(54) SECURE COMMUNICATION METHOD AND COMMUNICATION APPARATUS

(71) Applicant: HUAWEI TECHNOLOGIES CO., LTD., Shenzhen (CN)

(72) Inventor: Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 18/437,407

(22) Filed: Feb. 9, 2024

(65) Prior Publication Data

US 2024/0179516 A1 May 30, 2024

Related U.S. Application Data

(63) Continuation of application No. PCT/CN2022/110832, filed on Aug. 8, 2022.

(30) Foreign Application Priority Data

Aug. 10, 2021 (CN) .......................... 202110915945.6

(51) Int. Cl.
H04L 29/06 (2006.01)
H04W 12/033 (2021.01)
H04W 12/06 (2021.01)

(52) U.S. Cl.
CPC ......... H04W 12/033 (2021.01); H04W 12/06 (2013.01)

(58) Field of Classification Search
CPC ... H04W 12/033; H04W 12/06; H04W 12/03; H04W 12/069; H04W 8/24; H04W 12/37;
(Continued)

(56) References Cited

U.S. PATENT DOCUMENTS 10,785,652 B1 * 9/2020 Ravindranath ....... H04W 12/48
2020/0068391 A1 * 2/2020 Liu ........................ H04W 12/06
(Continued)

OTHER PUBLICATIONS

Kim, Kihong et al. New secure session resume protocol using IV count for wireless networks. 2005 IEEE 16th International Symposium on Personal, Indoor and Mobile Radio Communications. https://ieeexplore.ieee.org/stamp/stamp.jsp?tp=&arnumber=1651790 (Year: 2005).*

(Continued)

*Primary Examiner* — Jeremiah L Avery

(57) ABSTRACT

A secure communication method and apparatus includes: a session management function network element receives first security capability indication information from a terminal device, where the first security capability indication information indicates that the terminal device supports establishment of a secure connection between the terminal device and a server. The session management function network element determines, based on the first security capability indication information, a first server that supports establishment of the secure connection. The session management function network element sends information about the first server to the terminal device to establish the secure connection. According to the method, a server that matches a security capability of the terminal device can be selected, to ensure security protection for communication between the terminal device and the server, avoid information leakage or tampering, and help improve information exchange transmission efficiency.

20 Claims, 13 Drawing Sheets

(58) Field of Classification Search
CPC . H04W 76/10; H04L 61/4541; H04L 61/4511
USPC ............................................................. 726/1
See application file for complete search history.

(56) References Cited

U.S. PATENT DOCUMENTS

| | | | | |
|---|---|---|---|---|
| 2020/0196101 A1* | 6/2020 | Edge | ..................... | H04W 12/06 |
| 2021/0112049 A1* | 4/2021 | Yigit | ..................... | H04W 12/06 |
| 2021/0127386 A1* | 4/2021 | Edge | ....................... | H04W 4/20 |
| 2021/0168594 A1 | 6/2021 | Wu et al. | | |
| 2021/0176640 A1* | 6/2021 | Rajadurai | ........... | H04W 12/106 |
| 2021/0360565 A1* | 11/2021 | Agrawal | ................ | H04W 8/24 |
| 2021/0392477 A1* | 12/2021 | Taft | ....................... | H04W 24/02 |
| 2022/0070855 A1* | 3/2022 | Zhang | ................... | H04W 72/23 |
| 2022/0086632 A1* | 3/2022 | Wang | .................. | H04L 63/0869 |
| 2022/0095260 A1* | 3/2022 | Shan | ..................... | H04W 60/04 |
| 2022/0104154 A1* | 3/2022 | Wei | ..................... | H04W 36/305 |
| 2022/0116908 A1* | 4/2022 | Chun | ................... | H04W 24/08 |
| 2022/0116964 A1* | 4/2022 | Islam | ................... | H04L 1/1887 |
| 2022/0141662 A1* | 5/2022 | Liao | ....................... | H04W 12/08 |
| | | | | 726/1 |
| 2023/0370423 A1* | 11/2023 | Muñoz De La Torre Alonso | ....... | |
| | | | | H04L 63/0236 |

OTHER PUBLICATIONS

Fries, Steffen; Suhr, Andre. Securing Telecontrol in Smart Grid Environments. International ETG-Congress 2013; Symposium 1: Security in Critical Infrastructures Today. https://ieeexplore.ieee.org/stamp/stamp.jsp?tp=&arnumber=6661653 (Year: 2013).*

Al-Jarrah, Mohammad; Tamimi, Abdel-karim R. A Thin Security Layer Protocol over IP Protocol on TCP/IP Suite for Security Enhancement. 2006 Innovations in Information Technology. https://ieeexplore.ieee.org/stamp/stamp.jsp?tp=&arnumber=4085435 (Year: 2006).*

3rd Generation Partnership Project; Technical Specification Group Services and System Aspects; 5G System Enhancements for Edge Computing; Stage 2 (Release 17). 3GPP TS 23.548 V0.1.0 (Mar. 2021). total 32 pages.

Lenovo et al:"KI #1, Sol #22: update on LDNSR as standalone NF."3GPP TSG-SA2 Meeting #140E, Oct. 12-23, 2020, Electronic. S2-2007699, total 10 pages.

Ericsson, Deutsche Telekom:"Connectivity Models for Edge Computing."3GPP TSG-SA/WG2 Meeting #136-AH, Jan. 13-17, 2020, Incheon, Korea. S2-2001548, total 5 pages.

Ericsson:"IP Address Translation."3GPP TSG-SA2 # 142E (e-meeting) Nov. 16-20, 2020, Elbonia. S2-2008492, total 4 pages.

Vodafone (Rapporteur):"Minutes of UPIP discussion in SA3 #99."3GPP TSG-SA3 Meeting #99Bis-e, e-meeting, May 11-15, 2020. Draft 3 S3-201429, total 33 pages.

International Search Report dated Nov. 11, 2022, issued for International Application No. PCT/CN2022/110832 (11 pages).

Examination Report dated Jan. 14, 2025, issued for Australian Application No. 2022327451 (4 pages).

Extended European Search Report dated Sep. 30, 2024, issued for European Application No. 22855376.4.

* cited by examiner

SECURE COMMUNICATION METHOD AND COMMUNICATION APPARATUS

CROSS-REFERENCE TO RELATED APPLICATIONS

This application is a continuation of International Application No. PCT/CN2022/110832, filed on Aug. 8, 2022, which claims priority to Chinese Patent Application No. 202110915945.6, filed on Aug. 10, 2021. The disclosures of the aforementioned applications are hereby incorporated by reference in their entireties.

TECHNICAL FIELD

This disclosure relates to the field of information security, and in particular, to a secure communication method and a communication apparatus.

BACKGROUND

To effectively meet requirements of high bandwidth and low latency required by rapid development of the mobile internet and the internet of things and reduce network loads, the 3rd generation partnership project (3GPP) introduces an edge computing (EC) technology and defines that an edge application server discovery function (EASDF) supports to discover, through domain name query, an edge application server (EAS) that provides services. A terminal device exchanges a domain name system (DNS) message with an EASDF through a user plane to obtain EAS information. If security protection is not performed on the DNS message, a malicious attacker may eavesdrop on or modify the DNS message through an air interface. Therefore, how to ensure security protection for communication between a terminal device and a server is an urgent problem to be resolved.

SUMMARY

This disclosure provides a secure communication method and a communication apparatus, to effectively improve security protection for communication between a terminal device and a server.

According to a first aspect, a secure communication method is provided. The method may include: A session management function network element receives first security capability indication information from a terminal device, where the first security capability indication information indicates that the terminal device supports to establish a secure connection between the terminal device and a server. The session management function network element determines, based on the first security capability indication information, a first server that supports to establish the secure connection. The session management function network element sends information about the first server to the terminal device to establish the secure connection.

That the first security capability indication information indicates that the terminal device supports to establish a secure connection between the terminal device and a server may be understood that the first security capability indication information indicates that the terminal device has a capability of establishing the secure connection to the server. The secure connection may be understood as that security protection is performed on a message transmitted through the connection.

According to the method, a corresponding server is determined based on the first security capability indication information from the terminal device, so that the server can match the first security capability indication information, and the secure connection between the terminal device and the server is established, to ensure security protection for communication between the terminal device and the server, avoid message leakage or tampering, and help improve information exchange transmission efficiency.

With reference to the first aspect, in some implementations of the first aspect, when determining that user plane security protection is not enabled for a session of the terminal, the session management function network element may determine the first server based on the first security capability indication information, where the session is used for transmission of data between the terminal device and the first server.

In other words, when user plane security protection is not enabled, the first server that supports to establish the secure connection between the terminal and the server is determined.

In this solution, the server is determined based on the first security capability indication information and a user plane security protection status of the session, so that security protection between the terminal and the server can be enabled as required. When user plane security protection is not enabled for the session, security protection between the terminal and the server is chosen to be established, so that security protection can be ensured for communication.

With reference to the first aspect, in some implementations of the first aspect, the session management function network element determines, based on a user plane security status of the session or a user plane security policy of the session, that user plane security protection is not enabled for the session.

It should be understood that the user plane security status may include an activated state and a non-activated state. The activated state corresponds to that user plane security is enabled, and the non-activated state corresponds to that user plane security is disabled. The user plane security policy may include "enabling is required", "enabling is preferred", and "enabling is not needed", where "enabling is required" corresponds to that user plane security is enabled, "enabling is preferred" corresponds to that user plane security is enabled or user plane security is not enabled, and "enabling is not needed" usually corresponds to that user plane security is disabled. It may be understood that, determining may be performed based on the user plane security policy and the user plane security status to ensure that whether user plane security is enabled can be learned.

It should be further understood that, learning of the user plane security status and/or the user plane security policy can avoid a case in which the secure connection between the terminal and the server is further chosen to be established when the user plane security status is activated, to reduce information exchange latency and improve security protection efficiency.

With reference to the first aspect, in some implementations of the first aspect, the session management function network element receives indication information of the user plane security status of the session from an access network device.

With reference to the first aspect, in some implementations of the first aspect, the user plane security status of the session is a non-activated state.

In other words, when the user plane security status is the non-activated state, it indicates that user plane security is not enabled. The user plane security status may be sent by the access network device to the session management function network element. It should be understood that the user plane security status may alternatively be determined by the session management function network element based on the user plane security policy. This is not limited in this disclosure.

With reference to the first aspect, in some implementations of the first aspect, the session management function network element receives the user plane security policy of the session from a unified data management network element.

With reference to the first aspect, in some implementations of the first aspect, the user plane security policy of the session is "enabling is not needed".

In other words, when the user plane security policy is "enabling is not needed", it indicates that user plane security is not enabled. The user plane security policy may be sent by the unified data management network element to the session management function network element. It should be understood that the user plane security policy may alternatively be pre-configured in the session management function network element. This is not limited in this disclosure.

With reference to the first aspect, in some implementations of the first aspect, the session management function network element sends a request message to a network repository function network element, where the request message includes first security capability indication information, and the request message is used to request to discover a server that supports the secure connection. The session management function network element receives a response message of the request message from the network repository function network element, where the response message includes the information about the first server.

In other words, the session management function network element may perform a server discovery procedure via the network repository function network element, to obtain the information about the first server.

With reference to the first aspect, in some implementations of the first aspect, the session management function network element determines third security capability indication information based on the first security capability indication information. The session management function network element sends a request message to a network repository function network element, where the request message includes the third security capability indication information, and the request message is used to request to discover a server that supports the secure connection. The session management function network element receives a response message of the request message from the network repository function network element, where the response message includes the information about the first server. The third security capability indication information indicates to discover a server that supports the secure connection or that supports to activate the secure connection.

In other words, the session management function network element may perform a server discovery procedure via the network repository function network element, to obtain the information about the first server. The third security capability indication information may be determined based on the first security capability indication information, and may be information that is obtained after the first security capability indication information is forwarded but has a similar function. This is not limited in this disclosure.

With reference to the first aspect, in some implementations of the first aspect, the session management function network element sends a request message to a network repository function network element, where the request message is used to request to discover a server. The session management function network element receives a response message of the request message from the network repository function network element, where the response message includes the information about the first server and second security capability indication information, and the second security capability indication information indicates that the first server supports the secure connection or supports to activate the secure connection. The session management function network element determines the first server based on the second security capability indication information and the first security capability indication information.

In other words, the response message may further include a security capability indication of the first server.

It should be understood that sending a message in this disclosure may also be understood as invoking a service. For example, receiving a response message may be understood as receiving a response to the invoked service.

It should be understood that a server that can communicate with the terminal device may be one of a plurality of servers that support to establish the secure connection, for example, one of a plurality of servers that support a security capability indication may be selected in a discovery procedure: or may be a server that can flexibly adjust a security capability indication status. For example, the server may disable the security capability indication under a specific condition, or may activate the security capability indication under a specific condition. If the server is determined in the discovery procedure, the session management function network element may send activation indication information to the server.

With reference to the first aspect, in some implementations of the first aspect, the session management function network element sends a request message to the first server, where the request message is used to obtain security information of the first server. The session management function network element determines the information about the first server based on the security information of the first server, and sends the information about the first server to the terminal device to establish the secure connection. The security information of the first server is used to establish the secure connection.

With reference to the first aspect, in some implementations of the first aspect, the session management function network element may obtain an identifier of the first server, and then obtain the security information of the first server based on the identifier of the first server.

In other words, when obtaining the identifier and the security information of the first server, the session management network element may obtain the identifier and the security information of the first server at the same time, or obtain the identifier and the security information of the first server in a same procedure, for example, in a discovery procedure, or may obtain the identifier and the security information of the first server in sequence, or obtain the identifier and the security information of the first server in different information obtaining procedures. This is not limited in this disclosure.

With reference to the first aspect, in some implementations of the first aspect, the session management function network element sends activation indication information to the first server, where the activation indication information indicates the first server to activate the secure connection.

With reference to the first aspect, in some implementations of the first aspect, the session management function network element sends the activation indication information to the first server based on local second security capability indication information, where the activation indication information indicates the first server to activate the secure connection, and the second security capability indication information indicates that the first server supports to activate the secure connection.

With reference to the first aspect, in some implementations of the first aspect, the session management function network element sends a session establishment accept message to the terminal device, where the session establishment accept message includes the information about the first server: or the session management function network element sends a session modification command message to the terminal device, where the session modification command message includes the information about the first server.

In other words, after the first server is determined, the information about the first server may be carried in a session modification command, or the session establishment accept message, or a session establishment response message, to notify the terminal device.

With reference to the first aspect, in some implementations of the first aspect, the information about the first server includes at least one of an identifier of the first server, a security protocol supported by the first server, a security mechanism supported by the first server, a credential for verifying the first server, and a port number of the first server.

According to a second aspect, a secure communication method is provided. The method may include: A session management function network element receives first security capability indication information from a terminal device, where the first security capability indication information indicates that the terminal device supports to establish a secure connection between the terminal device and to a server. The session management function network element determines that user plane security is enabled for a session of the terminal device. The session management function network element determines a first server that does not support to establish or does not activate establishment of the secure connection, where the session is used for transmission of data between the terminal device and the first server. The session management function network element sends information about the first server to the terminal device, to establish a connection between the terminal device and the first server.

Selecting a server that supports not to activate the secure connection may be understood as that the first server determined by the session management network element has a capability of establishing the secure connection, but in this information exchange, the UE does not need to establish the secure connection to the server.

According to the method, when user plane security is enabled, a server that does not support to establish the secure connection (that is, the server does not have a capability of establishing the secure connection) or a server that supports not to activate the secure connection (that is, an activation status of the server may be dynamically adjusted, and a server that may not activate the secure connection is selected herein) is selected. This can avoid a case in which the secure connection between the terminal and the server is further chosen to be established when the user plane security activation status is activated, to reduce information exchange latency and improve security protection efficiency.

With reference to the second aspect, in some implementations of the second aspect, the session management function network element determines, based on a user plane security status of the session or a user plane security policy of the session, that user plane security protection is enabled for the session.

With reference to the second aspect, in some implementations of the second aspect, the session management function network element receives indication information of the user plane security status of the session from an access network device.

With reference to the second aspect, in some implementations of the second aspect, the user plane security status of the session is an activated state.

With reference to the second aspect, in some implementations of the second aspect, the session management function network element receives the user plane security policy of the session from a unified data management network element.

With reference to the second aspect, in some implementations of the second aspect, the user plane security policy of the session is "enabling is required".

With reference to the second aspect, in some implementations of the second aspect, the session management function network element sends a request message to a network repository function network element, where the request message includes first security capability indication information, and the request message is used to request to discover a server that supports the secure connection. The session management function network element receives a response message of the request message from the network repository function network element, where the response message includes the information about the first server.

In other words, the session management function network element may perform a server discovery procedure via the network repository function network element, to obtain the information about the first server.

With reference to the second aspect, in some implementations of the second aspect, the session management function network element sends a request message to a network repository function network element, where the request message is used to request to discover a server. The session management function network element receives a response message of the request message from the network repository function network element, where the response message includes the information about the first server and second security capability indication information, and the second security capability indication information indicates that the first server does not support to establish the secure connection or supports not to activate the secure connection.

In other words, the response message may further include the second security capability indication information.

It should be understood that a server that can communicate with the terminal device may be one of a plurality of servers that do not support to establish the secure connection, for example, one of a plurality of servers that do not support a security capability indication may be selected in a discovery procedure; or may be a server that can flexibly adjust a security capability indication status. For example, the server may disable the security capability indication under a specific condition, or may activate the security capability indication under a specific condition. If the server is determined in the discovery procedure, the session management function network element may send, to the server, not-to-activate indication information, or may send disable indication information, or may not send indication information, that is, may indicate by default no activation.

With reference to the second aspect, in some implementations of the second aspect, the session management function network element sends disable indication information to the first server, where the disable indication information indicates the first server to disable the secure connection.

With reference to the second aspect, in some implementations of the second aspect, the session management function network element sends disable indication information to the first server based on local second security capability indication information, where the disable indication information indicates the first server to disable the secure connection, and the second security capability indication information indicates that the first server supports not to activate the secure connection.

With reference to the second aspect, in some implementations of the second aspect, the session management function network element sends a session establishment accept message to the terminal device, where the session establishment accept message includes the information about the first server.

With reference to the second aspect, in some implementations of the second aspect, when the session management network element selects a server that supports not to activate the security connection, the session management function network element sends a session establishment accept message to the terminal device, where the session establishment accept message includes the information about the first server, and the information about the first server includes only an IP address or an IP prefix of the first server, but does not include security information.

In other words, after the first server is determined, the information about the first server may be carried in the session establishment accept message to notify the terminal device.

According to a third aspect, a secure communication method is provided. The method may include the following steps:

A session management function network element determines that a terminal device does not support to establish a secure connection between the terminal device and a server. The session management function network element sets a user plane security policy of a session of the terminal device to enabling security protection, where the session is used for transmission of data between the terminal device and a first server. The session management function network element sends information about the first server to the terminal device, to establish a connection between the terminal device and the first server.

When the terminal device does not support to establish the secure connection to the server, the session management network element enables user plane security protection by setting the user plane security policy to "enabling is required", to ensure security protection for information exchange of the terminal, avoid information tampering or leakage, and help improve information exchange transmission efficiency.

It should be understood that the terminal device may send information to indicate that the terminal device does not support to establish the secure connection to the server: or may not send information. When the session management function network element does not receive any indication information about whether the terminal device supports to establish the secure connection, the session management function network element may consider by default that the terminal device does not support to establish the secure connection.

With reference to the third aspect, in some implementations of the third aspect, the information about the first server includes an identifier of the first server.

In other words, when the terminal device does not support to establish the secure connection to the server, the session management function network element no longer needs to send security configuration information associated with a service to the terminal.

It should be understood that in this disclosure, the server may be an edge application service discovery function network element or a domain name query server, and the secure connection may be at least one of a DTLS-based secure connection, a TLS-based secure connection, and an HTTPS-based secure connection.

With reference to the third aspect, in some implementations of the third aspect, the session management function network element receives a session establishment request from the terminal device. The session management function network element determines, based on the session establishment request, that the terminal device does not support to establish the secure connection between the terminal device and the server.

It should be understood that when the session establishment request may not include a security capability indication of the terminal device, the session management function network element may consider by default that the terminal device does not support to establish the secure connection: or when the session establishment request includes indication information indicating that the terminal device does not support to establish the secure connection, the session management function network element may determine, based on the information, that the terminal device does not support to establish the secure connection to the server.

According to a fourth aspect, a secure communication method is provided. The method may include: A network repository function network element receives a request message from a session management function network element, where the request message is used to request to discover a server that supports to establish a secure connection to a terminal device. The network repository function network element determines information about a first server based on the request message. The network repository function network element sends a response message of the request message to the session management function network element, where the response message of the request message includes the information about the first server.

With reference to the fourth aspect, in some implementations of the fourth aspect, the request message includes first security capability indication information, and the first security capability indication information indicates that the terminal device supports to establish the secure connection between the terminal device and the server.

With reference to the fourth aspect, in some implementations of the fourth aspect, the network repository function network element receives a registration request from the first server, where the registration request includes second security capability indication information, the second security capability indication information indicates that the first server supports the secure connection or supports to activate the secure connection, and the registration request further includes any one or more of the following: a security protocol supported by the first server, a security mechanism supported by the first server, a credential for verifying the first server, and a port number of the first server.

It should be understood that the request may also include a type of the server, for example, an "edge application service discovery function network element". The network repository function network element may determine the first server in this type of server. The request may also include information such as a type of the server, an identifier of the server, and a security capability indication of the server, that is, specify a server as the first server. This is not limited in this disclosure.

In other words, when receiving a registration request from the server, the network repository function network element may obtain information about the server, and may send the information about the server to the terminal device after determining that the server can establish the secure connection to the terminal.

With reference to the fourth aspect, in some implementations of the fourth aspect, the information about the first server includes an identifier of the first server, or at least one of an identifier of the first server, a security protocol supported by the first server, a security mechanism supported by the first server, a credential for verifying the first server, and a port number of the first server.

It should be understood that, when the terminal device supports to establish the secure connection to the server, user plane security is not enabled for a session of the terminal device, and the server also supports to establish the secure connection to the terminal device, information such as an identifier and a security configuration of the server may be sent to the terminal device, and the terminal device establishes the secure connection to the server, to protect communication.

When the terminal device supports to establish the secure connection to the server, but user plane security is enabled for a session of the terminal device, or the terminal device does not support to establish the secure connection to the server, an identifier of the server may be sent to the terminal device, and the terminal device establishes the connection to the server for information exchange.

According to a fifth aspect, a communication apparatus is provided. The communication apparatus may include a transceiver unit and a processing unit. The transceiver unit may be configured to receive first security capability indication information from a terminal device, where the first security capability indication information indicates that the terminal device supports to establish a secure connection between the terminal device and a server. The processing unit may be configured to determine, based on the first security capability indication information, a first server that supports to establish the secure connection. The transceiver unit may be further configured to send information about the first server to the terminal device to establish the secure connection.

With reference to the fifth aspect, in some implementations of the fifth aspect, the processing unit is specifically configured to: when determining that user plane security protection is not enabled for a session of the terminal, determine the first server based on the first security capability indication information, where the session is used for transmission of data between the terminal device and the first server.

With reference to the fifth aspect, in some implementations of the fifth aspect, the processing unit is specifically configured to determine, based on a user plane security status of the session or a user plane security policy of the session, that user plane security protection is not enabled for the session.

With reference to the fifth aspect, in some implementations of the fifth aspect, the transceiver unit is specifically configured to receive the user plane security status of the session from an access network device.

With reference to the fifth aspect, in some implementations of the fifth aspect, the user plane security status of the session is a non-activated state.

With reference to the fifth aspect, in some implementations of the fifth aspect, the transceiver unit is specifically configured to receive the user plane security policy of the session from a unified data management network element.

With reference to the fifth aspect, in some implementations of the fifth aspect, the user plane security policy of the session is "enabling is not needed".

With reference to the fifth aspect, in some implementations of the fifth aspect, the transceiver unit is further configured to: send a request message to a network repository function network element, where the request message includes first security capability indication information, and the request message is used to request to discover a server that supports the secure connection; and receive a response message of the request message from the network repository function network element, where the response message of the request message includes the information about the first server.

With reference to the first aspect, in some implementations of the first aspect, the processing unit is further configured to: determine third security capability indication information based on the first security capability indication information. The transceiver unit sends a request message to a network repository function network element, where the request message includes the third security capability indication information, and the request message is used to request to discover a server that supports the secure connection. The transceiver unit receives a response message of the request message from the network repository function network element, where the response message includes the information about the first server. The third security capability indication information indicates to discover a server that supports the secure connection or that supports to activate the secure connection.

In other words, the session management function network element may perform a server discovery procedure via the network repository function network element, to obtain the information about the first server. The third security capability indication information may be determined based on the first security capability indication information, and may be information that is obtained after the first security capability indication information is forwarded but has a similar function. This is not limited in this disclosure.

With reference to the fifth aspect, in some implementations of the fifth aspect, the transceiver unit is further configured to: send a request message to a network repository function network element, where the request message is used to request to discover a server; and receive a response message of the request message from the network repository function network element, where the response message includes the information about the first server and second security capability indication information, and the second security capability indication information indicates that the first server supports the secure connection or supports to activate the secure connection. The processing unit is further configured to determine the first server based on the second security capability indication information and the first security capability indication information.

With reference to the fifth aspect, in some implementations of the fifth aspect, the transceiver unit is configured to send a request message to the first server, where the request message is used to obtain security information of the first server. The processing unit determines the information about the first server based on the security information of the first server, and sends the information about the first server to the terminal device to establish the secure connection.

With reference to the fifth aspect, in some implementations of the fifth aspect, the transceiver unit may obtain an identifier of the first server, and then the processing unit obtains the security information of the first server based on the identifier of the first server.

In other words, when obtaining the identifier and the security information of the first server, the session management network element may obtain the identifier and the security information of the first server at the same time, or obtain the identifier and the security information of the first server in a same procedure, for example, in a discovery procedure, or may obtain the identifier and the security information of the first server sequentially in a time sequence, or obtain the identifier and the security information of the first server in different information obtaining procedures. This is not limited in this disclosure.

With reference to the fifth aspect, in some implementations of the fifth aspect, the transceiver unit is further configured to send activation indication information to the first server, where the activation indication information indicates the first server to activate the secure connection.

With reference to the fifth aspect, in some implementations of the fifth aspect, the transceiver unit is further configured to send the activation indication information to the first server based on local second security capability indication information, where the activation indication information indicates the first server to activate the secure connection, and the second security capability indication information indicates that the first server supports to activate the secure connection.

With reference to the fifth aspect, in some implementations of the fifth aspect, the transceiver unit is further configured to: send a session establishment accept message to the terminal device, where the session establishment accept message includes the information about the first server; or send a session modification request message to the terminal device, where the session modification request message includes the information about the first server.

It should be understood that the information about the first server may be carried in a session modification command, the session establishment accept message, or a session establishment response message, to notify the terminal device.

With reference to the fifth aspect, in some implementations of the fifth aspect, the information about the first server includes at least one of an identifier of the first server, a security protocol supported by the first server, a security mechanism supported by the first server, a credential for verifying the first server, and a port number of the first server.

According to a sixth aspect, a communication apparatus is provided. The communication apparatus may include a processing unit and a transceiver unit. The transceiver unit may be configured to receive first security capability indication information from a terminal device, where the first security capability indication information indicates that the terminal device supports to establish a secure connection between the terminal device and a server. The processing unit may be configured to determine that user plane security is enabled for a session of the terminal device. The processing unit may be further configured to determine a first server that does not support to establish the secure connection or that supports not to activate the secure connection, where the session is used for transmission of data between the terminal device and the first server. The transceiver unit may be further configured to send information about the first server to the terminal device, to establish a connection between the terminal device and the first server.

Selecting a server that supports not to activate the secure connection may be understood as that the first server determined by the session management network element has a capability of establishing the secure connection, but in this information exchange, the UE does not need to establish the secure connection to the server.

With reference to the sixth aspect, in some implementations of the sixth aspect, the session management function network element determines, based on a user plane security status of the session or a user plane security policy of the session, that user plane security protection is enabled for the session.

With reference to the sixth aspect, in some implementations of the sixth aspect, the transceiver unit is specifically configured to obtain indication information of the user plane security status of the session from an access network device.

With reference to the sixth aspect, in some implementations of the sixth aspect, the user plane security status of the session is an activated state.

With reference to the sixth aspect, in some implementations of the sixth aspect, the transceiver unit is specifically configured to receive the user plane security policy of the session from a unified data management network element.

With reference to the sixth aspect, in some implementations of the sixth aspect, the user plane security policy of the session is "enabling is required".

With reference to the sixth aspect, in some implementations of the sixth aspect, the transceiver unit is further configured to: send a request message to a network repository function network element, where the request message includes first security capability indication information, and the request message is used to request to discover a server that supports the secure connection; and receive a response message of the request message from the network repository function network element, where the response message includes the information about the first server.

With reference to the sixth aspect, in some implementations of the sixth aspect, the transceiver unit is specifically configured to: send a request message to a network repository function network element, where the request message is used to request to discover a server; and receive a response message of the request message from the network repository function network element, where the response message includes the information about the first server and second security capability indication information, and the second security capability indication information indicates that the first server does not support to establish the secure connection or supports not to activate the secure connection.

With reference to the sixth aspect, in some implementations of the sixth aspect, the transceiver unit is further configured to send disable indication information to the first server, where the disable indication information indicates the first server to disable the secure connection.

With reference to the sixth aspect, in some implementations of the sixth aspect, the transceiver unit is further configured to send the disable indication information to the first server based on local second security capability indication information, where the disable indication information indicates the first server to disable the secure connection, and the second security capability indication information indicates that the first server supports not to activate the secure connection.

It should be understood that a server that can communicate with the terminal device may be one of a plurality of servers that do not support to establish the secure connection, for example, one of a plurality of servers that do not support a security capability indication may be selected in a discovery procedure: or may be a server that can flexibly adjust a security capability indication status. For example, the server may disable the security capability indication under a specific condition, or may activate the security capability indication under a specific condition. If the server is determined in the discovery procedure, the session management function network element may send, to the server, not-to-activate indication information, or may send disable indication information, or may not send indication information, that is, may indicate by default no activation.

With reference to the sixth aspect, in some implementations of the sixth aspect, when the processing unit selects a server that supports not to activate the secure connection, the transceiver unit sends a session establishment accept message to the terminal device, where the session establishment accept message includes the information about the first server.

With reference to the sixth aspect, in some implementations of the sixth aspect, the transceiver unit sends a session establishment accept message to the terminal device, where the session establishment accept message includes the information about the first server, and the information about the first server includes only an IP address or an IP prefix of the first server, but does not include security related information.

According to a seventh aspect, a communication apparatus is provided. The communication apparatus may include a transceiver unit and a processing unit. The processing unit is configured to determine that a terminal device does not support to establish a secure connection between the terminal device and a server. The processing unit is further configured to set a user plane security policy of a session of the terminal device to enable security protection, where the session is used for transmission of data between the terminal device and a first server. The transceiver unit is configured to send information about the first server to the terminal device, to establish a connection between the terminal device and the first server.

With reference to the seventh aspect, in some implementations of the seventh aspect, the information about the first server includes an identifier of the first server.

With reference to the seventh aspect, in some implementations of the seventh aspect, the transceiver unit is further configured to receive a session establishment request from the terminal device. The processing unit is specifically configured to determine, based on the session establishment request, that the terminal device does not support to establish the secure connection between the terminal device and the server.

According to an eighth aspect, a communication apparatus is provided. The communication apparatus may include a transceiver unit and a processing unit. The transceiver unit may be configured to receive a request message from a session management function network element, where the request message is used to request to discover a server that supports to establish a secure connection to a terminal device. The processing unit may be configured to determine information about a first server based on the request message. The transceiver unit is further configured to send a response message of the request message to the session management function network element, where the response message of the request message includes the information about the first server.

With reference to the eighth aspect, in some implementations of the eighth aspect, the request message includes first security capability indication information, and the first security capability indication information indicates that the terminal device supports to establish the secure connection between the terminal device and the server.

With reference to the eighth aspect, in some implementations of the eighth aspect, the transceiver unit is further configured to receive a registration request from the first server, where the registration request includes second security capability indication information, the second security capability indication information indicates that the first server supports the secure connection or supports to activate the secure connection, and the registration request further includes any one or more of the following: a security protocol supported by the first server, a security mechanism supported by the first server, a credential for verifying the first server, and a port number of the first server.

With reference to the eighth aspect, in some implementations of the eighth aspect, the first server includes an edge application service discovery function network element.

With reference to the eighth aspect, in some implementations of the eighth aspect, the information about the first server includes an identifier of the first server, or at least one of an identifier of the first server, a security protocol supported by the first server, a security mechanism supported by the first server, a credential for verifying the first server, or a port number of the first server.

It should be understood that descriptions of explanations, supplements, and beneficial effects of the first aspect are also applicable to the second aspect, the third aspect, the fourth aspect, and corresponding apparatus sides (the fifth aspect, the sixth aspect, the seventh aspect, and the eighth aspect). Details are not described again.

According to a ninth aspect, a computer-readable medium is provided. The computer-readable medium stores program code executed by a communication apparatus, and the program code includes instructions used to perform the communication method according to the first aspect, the second aspect, the third aspect, or the fourth aspect, or any one of the possible implementations of the first aspect, the second aspect, the third aspect, or the fourth aspect, or all the possible implementations of the first aspect, the second aspect, the third aspect, or the fourth aspect.

According to a tenth aspect, a computer program product including instructions is provided. When the computer program product runs on a computer, the computer is enabled to perform the method according to the first aspect, the second aspect, the third aspect, or the fourth aspect, or any one of the possible implementations of the first aspect, the second aspect, the third aspect, or the fourth aspect, or all the possible implementations of the first aspect, the second aspect, the third aspect, or the fourth aspect.

According to an eleventh aspect, a communication system is provided. The communication system includes an apparatus that has a function of implementing the method according to the first aspect, the second aspect, the third aspect, or the fourth aspect, or any one of the possible implementations of the first aspect, the second aspect, the third aspect, or the fourth aspect, or all the possible implementations and various possible designs of the first aspect, the second aspect, the third aspect, or the fourth aspect.

According to a twelfth aspect, a processor is provided, is coupled to a memory, and is configured to perform the method according to the first aspect, the second aspect, the third aspect, or the fourth aspect, or any one of the possible implementations of the first aspect, the second aspect, the third aspect, or the fourth aspect, or all the possible implementations of the first aspect, the second aspect, the third aspect, or the fourth aspect.

According to a thirteenth aspect, a chip is provided. The chip includes a processor and a communication interface, the communication interface is configured to communicate with an external component or an internal component, and the processor is configured to implement the method according to the first aspect, the second aspect, the third aspect, or the fourth aspect, or any one of the possible implementations of the first aspect, the second aspect, the third aspect, or the fourth aspect, or all the possible implementations of the first aspect, the second aspect, the third aspect, or the fourth aspect.

Optionally, the chip may further include a memory. The memory stores instructions. The processor is configured to execute the instructions stored in the memory or other instructions. When the instructions are executed, the processor is configured to implement the method according to any one of the first aspect, the second aspect, the third aspect, the fourth aspect, or the possible implementations of the first aspect, the second aspect, the third aspect, or the fourth aspect.

Optionally, the chip may be integrated into a terminal.

BRIEF DESCRIPTION OF DRAWINGS

FIG. 2(*b*) is a schematic diagram of an architecture of another service-oriented communication system applicable to an embodiment of this disclosure;

DESCRIPTION OF EMBODIMENTS

The following describes technical solutions of this disclosure with reference to accompanying drawings.

Figure 1:
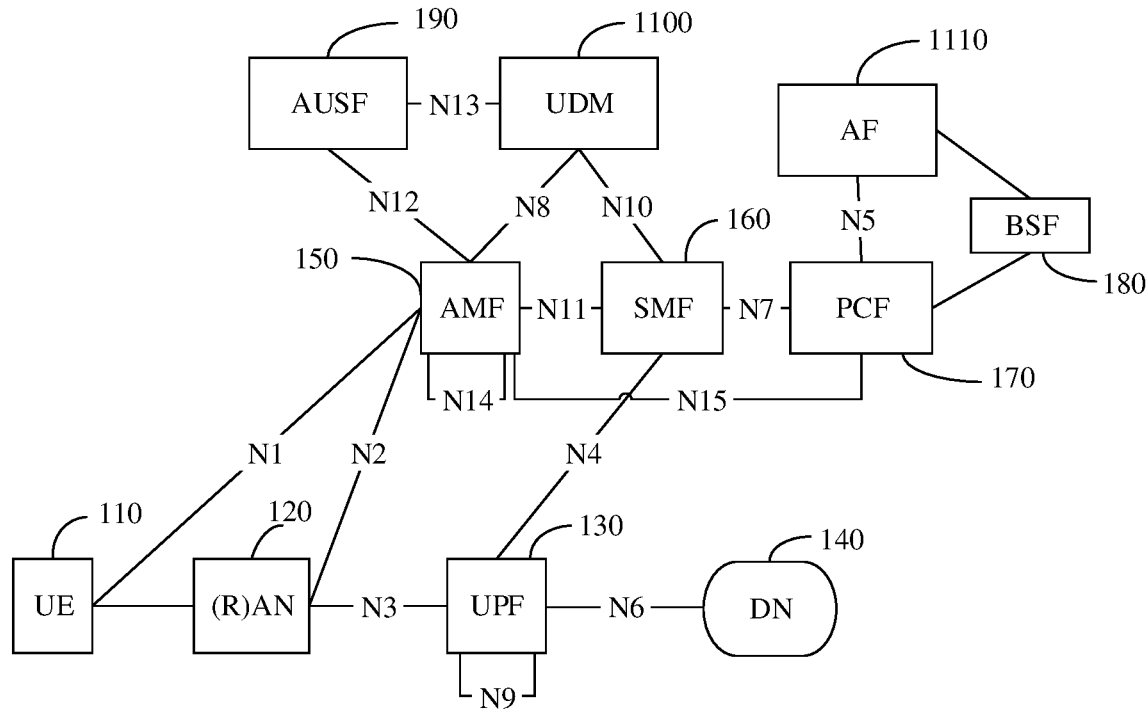
FIG. 1 is a schematic diagram of an architecture of a communication system applicable to an embodiment of this disclosure.

FIG. 1 is a schematic diagram of a network architecture applicable to an embodiment of this disclosure. The following separately describes parts in the network architecture shown in the figure.

1. User equipment (UE) 110: may include various hand-held devices having a wireless communication function, vehicle-mounted devices, wearable devices, computing devices, or other processing devices connected to a wireless modem, various forms of terminals, mobile stations (MSs), terminals, soft clients, and the like. For example, the user equipment may be a water meter, an electricity meter, a sensor, or the like.

For example, the user equipment in this embodiment of this disclosure may be an access terminal, a subscriber unit, a subscriber station, a mobile station, a relay station, a remote station, a remote terminal, a mobile device, a user terminal, a terminal device, a wireless communication device, a user agent, or a user apparatus. The user equipment may alternatively be a cellular phone, a cordless phone, a session initiation protocol (SIP) phone, a wireless local loop (WLL) station, a personal digital assistant (PDA), a hand-held device having a wireless communication function, a computing device, another processing device connected to a wireless modem, a vehicle-mounted device, a wearable device, user equipment in a 5G network, user equipment in a future evolved public land mobile network (PLMN), user equipment in the future internet of vehicles, or the like. This is not limited in embodiments of this disclosure.

By way of example, and not limitation, in this embodiment of this disclosure, the wearable device may also be referred to as a wearable smart device, and is a general term of wearable devices developed by intelligently designing daily wear by using a wearable technology, such as glasses, gloves, a watch, clothing, and shoes. The wearable device is a portable device that is directly worn on the body or integrated into clothes or an accessory of a user. The wearable device is not only a hardware device, but also implements a powerful function through software support, data exchange, and cloud interaction. In broad sense, wearable smart devices include full-featured and large-sized devices that can implement complete or partial functions without depending on smartphones, such as smart watches or smart glasses, and devices that focus only on a type of application function and need to work with other devices such as smartphones, such as various smart bands or smart jewelry for monitoring physical symptoms.

In addition, the user equipment in embodiments of this disclosure may alternatively be user equipment in an internet of things (IoT) system. IoT is an important part in future development of information technologies. A main technical feature of the IoT is to connect things to a network by using a communication technology, to implement an intelligent network for human-machine interconnection and thing-thing interconnection. In embodiments of this disclosure, the IoT technology may implement mass connection, intensive coverage, and terminal power saving by using a narrow band (NB) technology or the like. In addition, in embodiments of this disclosure, the user equipment may further include sensors such as a smart printer, a train detector, and a gas station. Main functions include: collecting data (some user equipment), receiving control information and downlink data of an access network device, sending an electromagnetic wave, and transmitting uplink data to the access network device.

2. (Radio) access network ((R)AN) device 120: configured to provide a network access function for authorized user equipment in a specific area, and can use transmission tunnels with different quality based on user equipment levels, service requirements, and the like.

The (R)AN can manage radio resources and provide an access service for user equipment, to forward a control signal and user equipment data between the user equipment and a core network. The (R)AN may also be understood as a base station in a conventional network.

For example, the access network device in embodiments of this disclosure may be any communication device that has a wireless transceiver function and that is configured to communicate with the user equipment. The access network device includes but is not limited to an evolved NodeB (eNB), a radio network controller (RNC), a NodeB (NB), a base station controller (BSC), a base transceiver station (BTS), a home base station (for example, a home evolved NodeB, HeNB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the access network device may be a gNB or a transmission point (TRP or TP) in a 5G system, for example, an NR system, may be one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling, for example, RRC layer signaling, may also be considered as being sent by the DU or sent by the DU and the AAU. It may be understood that the access network device may be a device including one or more of a CU node, a DU node, and an AAU node. In addition, the CU may be classified as an access network device in an access network (RAN), or the CU may be classified as an access network device in a core network (CN). This is not limited in this disclosure.

3. User plane network element 130: is used for packet routing and forwarding, quality of service (QoS) processing on user plane data, and the like.

In a 5G communication system, the user plane network element may be a user plane function (UPF) network element. In a future communication system, the user plane network element may still be the UPF network element, or may have another name. This is not limited in this disclosure.

4. Data network element 140: is configured to provide a network for data transmission.

In a 5G communication system, the data network element may be a data network (DN) element. In a future communication system, the data network element may still be the DN element, or may have another name. This is not limited in this disclosure.

5. Access management network element 150: is mainly used for mobility management, access management, and the like, and may be configured to implement functions, for example, lawful interception and access authorization/authentication, other than session management in functions of a mobility management entity (MME).

In a 5G communication system, the access management network element may be an access management function (AMF) network element. In a future communication system, the access management network element may still be the AMF network element, or may have another name. This is not limited in this disclosure.

6. Session management network element 160: is mainly configured to: manage a session, assign and manage an internet protocol (IP) address of a terminal device, select an endpoint that can manage a user plane function interface and a policy control and charging function interface, notify downlink data, and the like.

In a 5G communication system, the session management network element may be a session management function (SMF) network element. In a future communication system, the session management network element may still be the SMF network element, or may have another name. This is not limited in this disclosure.

7. Policy control network element 170: is configured to: guide a unified policy framework of network behavior, and provide policy rule information for a control plane function network element (for example, an AMF or SMF network element), and the like.

In a 4G communication system, the policy control network element may be a policy and charging rules function (PCRF) network element. In a 5G communication system, the policy control network element may be a policy control function (PCF) network element. In a future communication system, the policy control network element may still be the PCF network element, or may have another name. This is not limited in this disclosure.

8. Binding support network element 180: is configured to: search for a PCF associated with a session or search for a PCF associated with UE.

In a 5G communication system, the binding support network element may be a binding support function (BSF) network element. In a future communication system, the binding support network element may still be the BSF network element, or may have another name. This is not limited in this disclosure.

9. Authentication server 190: is configured to: authenticate a service, generate a key to implement two-way authentication for a terminal device, and support a unified authentication framework.

In a 5G communication system, the authentication server may be an authentication server function (AUSF) network element. In a future communication system, the authentication server function network element may still be the AUSF network element, or may have another name. This is not limited in this disclosure.

10. Data management network element 1100: is configured to: process a terminal device identifier, perform access authentication, registration, and mobility management, and the like.

In a 5G communication system, the data management network element may be a unified data management (UDM) network element. In a future communication system, unified data management may still be the UDM network element, or may have another name. This is not limited in this disclosure.

11. Application network element: is configured to: perform application-affected data routing, access a network exposure function network element, interact with a policy framework to perform policy control, and the like.

In a 5G communication system, the application network element may be an application function (AF) network element. In a future communication system, the application network element may still be the AF network element, or may have another name. This is not limited in this disclosure.

12. Network repository network element: is configured to maintain real-time information of all network function services in a network.

In a 5G communication system, the network repository network element may be a network registration function (NRF) network element. In a future communication system, the network repository network element may still be the NRF network element, or may have another name. This is not limited in this disclosure.

It may be understood that the network elements or the functions may be network elements in a hardware device, software functions run on dedicated hardware, or virtualized functions instantiated on a platform (for example, a cloud platform).

For ease of description, this disclosure is described below by using an example in which the application network element is the AF network element, the binding support network element is the BSF network element, the network repository network element is the NRF network element, and the policy control network element is the PCF network element.

Further, the AF network element is briefly referred to as an AF, the BSF network element is briefly referred to as a BSF, the NRF network element is briefly referred to as an NRF, and the PCF network element is briefly referred to as a PCF. In other words, in the following descriptions of this disclosure, the AF may be replaced with the application network element, the BSF may be replaced with the binding support network element, the NRF may be replaced with the network repository network element, and the PCF may be replaced with the policy control network element.

For ease of description, in this disclosure, a data transmission method is described by using an example in which an apparatus is an AF entity, a BSF entity, or a PCF entity. For an implementation method in which the apparatus is a chip in an AF entity, a chip in a BSF entity, or a chip in a PCF entity, refer to specific descriptions about the data transmission method in which the apparatus is the AF entity, the BSF entity, or the PCF entity. Details are not repeated.

In the network architecture shown in FIG. 1, the terminal device is connected to the AMF through an N1 interface, the RAN is connected to the AMF through an N2 interface, and the RAN is connected to the UPF through an N3 interface.

UPFs are connected to each other through an N9 interface, and the UPF is interconnected to a data network (DN) through an N6 interface.

The SMF controls the UPF through an N4 interface. The AMF is connected to the SMF through an N11 interface.

The AMF obtains subscription data of the terminal device from a unified data management (UDM) unit through an N8 interface. The SMF obtains the subscription data of the terminal device from the UDM unit through an N10 interface.

The AMF obtains policy data from the PCF through an N15 interface. The SMF obtains the policy data from the PCF through an N7 interface.

The AF and the PCF are connected through an N5 interface.

In addition, the AF and the PCF each are connected to the BSF. When the SMF triggers establishment of a policy session, the PCF registers, with the BSF, session information of the policy session and an identifier of a PCF corresponding to the policy session. In this case, the AF may query, from the BSF based on the session information corresponding to the policy session, the identifier of the PCF corresponding to the policy session. In this way, the SMF and the AF select a same PCF for a same session.

It should be noted that names of the network elements and communication interfaces between the network elements in FIG. 1 are briefly described by using an example specified in a current protocol. However, embodiments of this disclosure are not limited to being applicable only to a currently known communication system. Therefore, standard names used when the current protocol is used as an example for description are all function descriptions. A specific name of a network element, an interface, signaling, or the like is not limited in this disclosure, and only represents a function of the network element, the interface, or the signaling, and may be correspondingly extended to another system, for example, a 2G, 3G, 4G, or future communication system.

The network architecture that can be applied to the embodiment of this disclosure shown in FIG. 1 is merely an example for description, and the network architecture applicable to this embodiment of this disclosure is not limited thereto. Any network architecture that can implement the functions of the foregoing network elements is applicable to embodiments of this disclosure.

For example, in some network architectures, network function network elements and entities such as the AMF network element, the SMF network element, the PCF network element, the BSF network element, and the UDM network element are all referred to as network function (NF) network elements. Alternatively, in some other network architectures, a set of network elements such as the AMF network element, the SMF network element, the PCF network element, the BSF network element, and the UDM network element may be referred to as a control plane function network element.

The technical solutions in embodiments of this disclosure may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, or a future network. The technical solution provided in this disclosure may be further applied to a future communication system, for example, a 6th generation mobile communication system. Alternatively, the communication system may be a public land mobile network (PLMN), a device-to-device (D2D) communication system, a machine-to-machine (M2M) communication system, an internet of things (IoT) communication system, or another communication system.

In embodiments of this disclosure, the user equipment or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of a body performing the method provided in embodiments of this disclosure is not particularly limited in embodiments of this disclosure provided that a program recording code of the method provided in embodiments of this disclosure can be run to perform communication according to the method provided in embodiments of this disclosure. For example, the body performing the method provided in embodiments of this disclosure may be the user equipment or the access network device, or may be a function module that can invoke and execute the program in the user equipment or the access network device.

In addition, aspects or features of this disclosure may be implemented as a method, an apparatus, or a product that uses standard programming and/or engineering technologies. The term "product" used in this disclosure covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a wireless channel, and various other media that can store, include, and/or carry instructions and/or data.

Figures 2A, 2B:
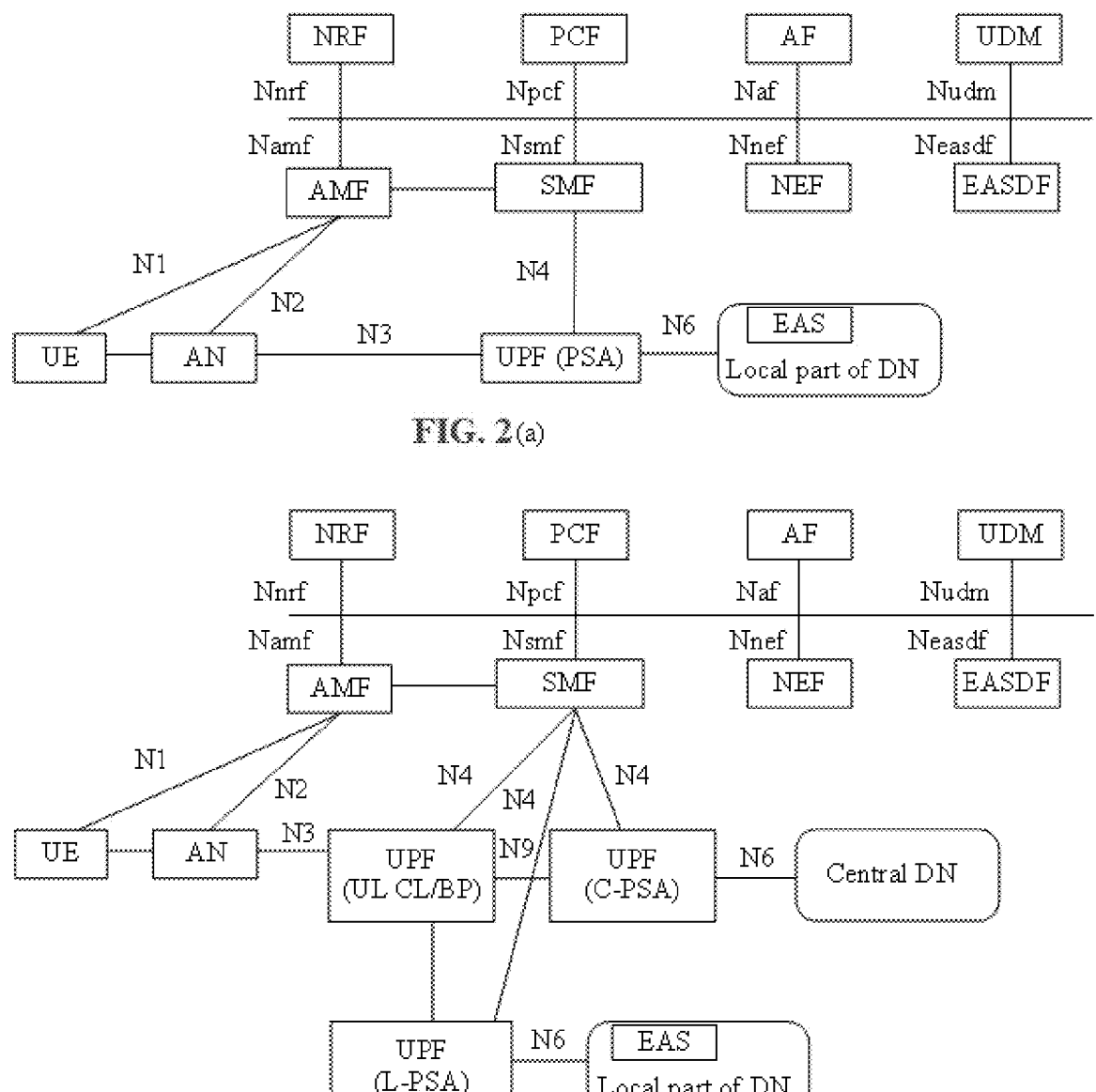
FIG. 2(*a*) is a schematic diagram of an architecture of a service-oriented communication system applicable to an embodiment of this disclosure.

(FIG. 2(*a*) is a schematic diagram of an example of a service-oriented architecture supporting edge computing (EC) that is applicable to an embodiment of this disclosure. An EASDF may interact with a core network element, and the architecture supports access to an edge application server EAS without using an uplink classifier (UL CL) or a branching point (BP).

FIG. 2(*b*) is a schematic diagram of another example of a service-oriented architecture supporting EC that is applicable to an embodiment of this disclosure. An EASDF may interact with a core network element. This architecture supports access to an EAS through a UL CL or a BP.

A specific structure of a body performing the method provided in embodiments of this disclosure is not particularly limited in the following embodiments provided that a program recording code of the method provided in embodiments of this disclosure can be run to perform communication according to the method provided in embodiments of this disclosure. For example, the body performing the method provided in embodiments of this disclosure may be the terminal device or the core network device, or may be a function module that can invoke and execute the program in the terminal device or the core network device.

For ease of understanding of embodiments of this disclosure, the following descriptions are provided.

First, in this disclosure, "enabling" may include direct enabling and indirect enabling. When a piece of information is described to enable A, it may indicate that the information directly enables A or indirectly enables A, but it does not indicate that A is definitely carried in the information.

Information enabled by the information is referred to as to-be-enabled information. In a specific implementation process, the to-be-enabled information is enabled in many manners, for example, including but not limited to the following: The to-be-enabled information may be directly enabled, for example, the to-be-enabled information or an index of the to-be-enabled information. Alternatively, the to-be-enabled information may be indirectly enabled by enabling other information, where there is an association relationship between the other information and the to-be-enabled information. Alternatively, only a part of the to-be-enabled information may be enabled, and another part of the to-be-enabled information is known or agreed on in advance. For example, specific information may alternatively be enabled in an arrangement sequence of all pieces of information that is pre-agreed on (for example, stipulated in a protocol), to reduce enabling overheads to some extent. In addition, a common part of all pieces of information may be further identified and enabled in a unified manner, to reduce enabling overheads caused by separately enabling same information.

Second, the terms "first", "second", and various numerical numbers (for example, "#1" and "#2") shown in this disclosure are merely for ease of description, and are used to distinguish between objects, but are not intended to limit the scope of embodiments of this disclosure, for example, are used to distinguish between different messages, but are not used to describe a particular order or sequence. It should be understood that the objects described in such a way are interchangeable in a proper circumstance, so that a solution other than embodiments of this disclosure can be described.

Third, in this disclosure, "preset" may include "predefined", for example, defined in protocols. "Predefined" may be implemented by prestoring corresponding code or a corresponding table in a device (for example, including a terminal device or a core network device), or another manner that may indicate related information. A specific implementation thereof is not limited in this disclosure.

Fourth, "being stored" in embodiments of this disclosure may be "being stored in one or more memories". The one or more memories may be separately disposed, or may be integrated into an encoder, a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this disclosure.

Fifth, "protocols" in embodiments of this disclosure may be standard protocols in the communication field, for example, may include a 5G protocol, a new radio (NR) protocol, and a related protocol used for a future communication system. This is not limited in this disclosure.

For ease of understanding this disclosure, related concepts are briefly explained in advance.

1. Edge Computing

A 5G system can provide low-latency user experience and efficient massive data. This means that the 5G system needs to support distributed deployment of applications and content to a network edge. Edge computing (EC) is considered as a key technology for implementing such deployment. Through edge computing, operators can host applications and content of the operators and/or third-parties to be close to users. UE can access the applications/content through a (R)AN and a locally deployed UPF to meet end-to-end user experience expectations and allow low-latency and heavy-traffic applications to be offloaded from a backbone network to an edge. Based on the EC technology, a service (that is, an EAS) is deployed on a sink UPF (that is, a local UPF), and a central DN is deployed on a remote UPF Compared with a path for the UE to access the central DN, a path for the UE to access the local EAS to obtain a service is greatly shortened. The EC technology may provide low-latency and high-bandwidth services for the users.

2. Connection Model for Enabling Edge Computing

Connection model 1: distributed anchor Services are deployed in an edge area in a distributed manner, and the services are accessed through an anchor (PDU session anchor, PSA) located in the edge area, that is, a UPF that interacts with a DN. When UE moves, the anchor can be changed to optimize a path. For example, the UE establishes a session whose session and service continuity mode (SSC mode) is an SSC mode 2 or an SSC mode 3. When a path is not optimal, the UE establishes a new session to change an anchor, so as to optimize the path.

Connection model 2: offloading DN services are deployed in both an edge area and a central area. In an offloading manner, a local anchor is inserted into a PDU session to offload a service flow to an edge area, to implement access to an edge service. An offloading point may be specifically an uplink classifier (UL CL) or a branching point (BP).

Connection model 3: multi-session DN services are deployed in both an edge area and a central area. In a multi-session manner, a session for accessing an edge service is established to implement access to the edge service.

3. Domain Name Query

A DNS is a service that provides mapping and translation between a domain name and an internet protocol (IP) address through a host information database. For example, UE may resolve a domain name to a corresponding IP address by using a DNS server (, to implement access of the UE to a service.

For example, in a simple DNS query process, the UE starts a service, initiates a session establishment procedure, or reuses an existing session of the UE, to establish a user plane connection between the UE and a UPF. In the session establishment process, an SMF sends a DNS server address to the UE. For an APP (or the service), the UE determines whether there is a DNS record (a correspondence between a domain name and an IP address) related to a domain name of the service. If there is the DNS record, the UE determines, based on the DNS record, an IP address corresponding to the domain name, and uses the IP address as a destination IP address of the service. If there is no DNS record, the UE initiates a DNS query process. The UE sends a DNS query message to a DNS server, where the DNS query message carries the domain name of the service.

The DNS query message is sent to the DNS server through a user plane connection between the UE and the UPF. The DNS server receives the DNS query, and queries a database to obtain the IP address corresponding to the domain name; and returns a DNS response message to the UE, where the message carries the IP address corresponding to the domain name and/or a time to live (TTL). The TTL indicates a time period for which the DNS record can be cached, and may be a 4-byte integer without s sign. A value 0 indicates that the DNS record cannot be cached. The UE stores the DNS record, that is, stores a correspondence between the domain name and the IP address.

4. Local Service Discovery Mechanism Based on a Domain Name Query Mechanism

UE accesses a data network DN by establishing a protocol data unit PDU session. For the connection model 2, how the UE discovers a locally deployed edge application server, TS23.548 1.0.0 proposes a method for discovering, through domain name query, an EAS that provides a service.

Figure 3A:
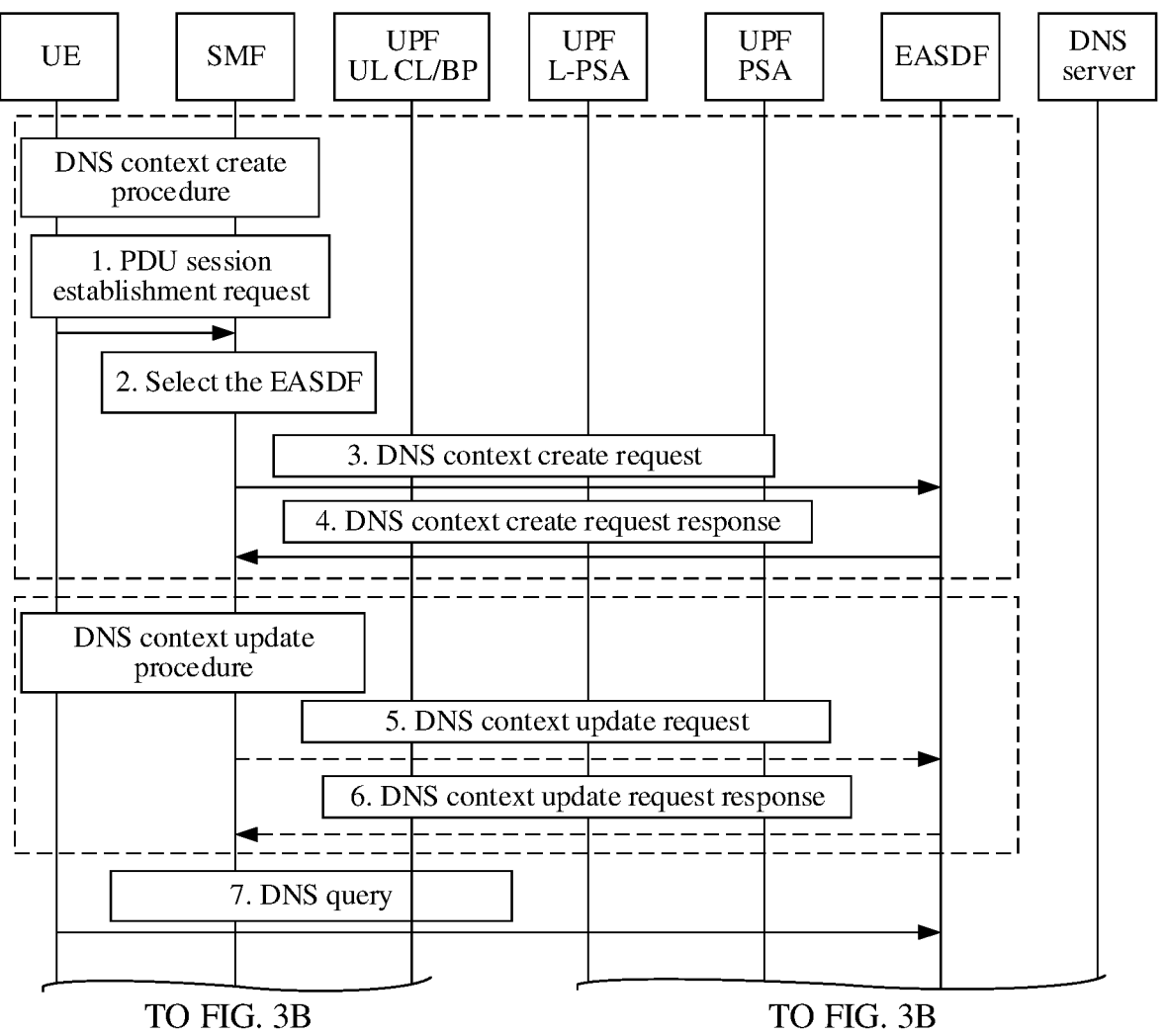
FIG. 3A and FIG. 3B are a schematic flowchart of information transmission.
Figure 3B:
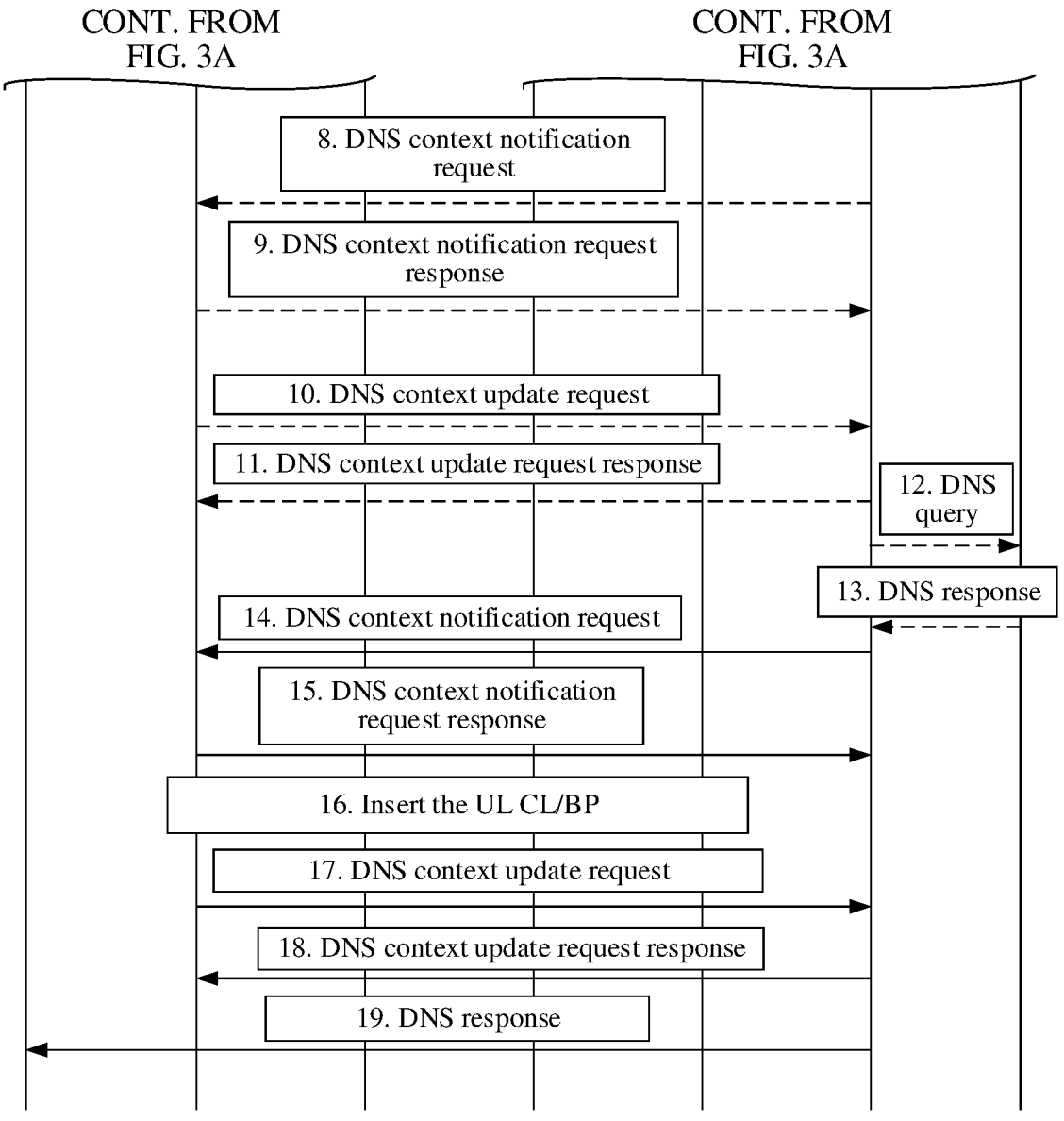

A: A DNS query message sent by the UE is processed by an EASDF. As shown in FIG. 3A and FIG. 3B, in a scenario in which the EASDF is used to process the DNS query of the UE, in a PDU session establishment procedure, an SMF selects the EASDF and provides an address of the EASDF to the UE, and the UE sends the DNS query to the EASDF. The SMF may configure a DNS message handling rule for the EASDF, so that the EASDF forwards a DNS message and/or report of the UE when detecting the DNS message. The DNS message handling rule includes information used for DNS message detection and an associated action. For example, the DNS message handling rule may include a DNS message handling rule precedence, a DNS message detection template, and/or an action. The DNS message detection template may include a message type (including a DNS query or a DNS response), a source IP address, a fully qualified domain name (FQDN) range array, and/or an FQDN range array and/or an EAS IP address range array. The action may include: The EASDF reports DNS message content to the SMF, sends the DNS message to a pre-configured DNS server, a DNS resolver, or a specified DNS server, replaces a DNS message address with a specified DNS server address or with a locally configured DNS server or DNS resolver, stores the DNS message, reports the DNS message content to the SMF, sends a cached DNS response message to the UE, and/or the like.

A specific procedure is as follows:

1. According to section 4.3.2.2.1 in TS23.502, the UE sends a PDU session establishment request to the SMF.

2. In a PDU session establishment process, the SMF selects an EASDF, and the SMF can perform an EASDF discovery procedure based on a local configuration of the SMF or through an NRF.

It may be understood that if the SMF determines, based on the local configuration, that interaction between the EASDF and the DNS server in the DN needs to be performed through an anchor UPF, the SMF further needs to configure the anchor UPF between the EASDF and the UPF, to forward a DNS message.

After the discovery procedure ends, the SMF may include an EASDF address in a PDU session establishment accept message and send the message to the UE. The UE configures the EASDF as a DNS server for a PDU session.

3. The SMF invokes a DNS context create (Neasdf_DNSContext_Create) request, where the request includes a UE IP address, a callback uniform resource identifier (URI), and a rule for requesting and processing the DNS message from the UE (that is, the DNS message handling rule). The EASDF creates a DNS context for the PDU session, for example, stores the UE IP address, the callback URI, and the DNS message handling rule.

4. The EASDF invokes a DNS context create request response, where the response may include an IP address of the EASDF, an EASDF context identifier, and/or a result indication.

5. When a condition for triggering the SMF to update context information on the EASDF occurs (for example, UE mobility, reporting information of the EASDF, or local UPF insertion/deletion), the SMF sends a DNS context update (Neasdf_DNSContext_Update) request to the EASDF, where the request includes the EASDF context identifier and/or the DNS message handling rule.

6. The EASDF sends an Neasdf_DNSContext_Update response to the SMF.

7. When a service needs to be initiated, the UE sends a DNS query message to the EASDF.

8. When the DNS query message received by the EASDF matches a configured reporting condition, the EASDF sends a DNS context notify (Neasdf_DNSContext_Notify) request to the SMF.

9. The SMF sends an Neasdf_DNSContext_Notify response to the EASDF.

10. If the SMF determines, based on the received FQDN, that the DNS message handling rule needs to be updated, the SMF sends a DNS context update request to the EASDF, where the message includes an updated DNS message handling rule.

For Option A, the DNS handling rule includes an IP address used to create an ECS option (EDNS client Subnet option, EDNS client suboption).

For Option B, the DNS handling rule includes an IP address of a local DNS server. The EASDF is also instructed to send the DNS query to the pre-configured DNS server or the DNS resolver.

11. The EASDF sends a DNS context update response to the SMF.

12. The EASDF processes the DNS query message received from the UE, specifically including:

(a) Option A: The EASDF includes an ECS option in the DNS query message.

(b) Option B: The EASDF sends the DNS query message to the local DNS server.

If the received DNS query request does not trigger interaction with the SMF, the EASDF can directly send the received message to the configured DNS server or the DNS resolver.

13. The EASDF receives a DNS response from a DNS system and determines to send a DNS response to the UE.

14. If an EAS IP address or an FQDN in the DNS response message matches a condition for triggering reporting, the EASDF sends DNS message reporting information to the SMF, where the information is included in the Neasdf_DNSContext_Notify request. If the EASDF receives a plurality of EAS IP addresses from the DNS server, the DNS message may include the plurality of EAS IP addresses. The DNS message reporting may include the FQDN and ECS selection.

15. The SMF sends the Neasdf_DNSContext_Notify response to the EASDF.

16. The SMF may select a UL CL/BP and a local PSA and insert the UL CL/BP and the local PSA.

17. The SMF invokes the Neasdf_DNSContext_Update request. The message includes the DNS message handling rule, and the DNS message handling rule indicates the EASDF to send a cached DNS response message to the UE. The DNS message handling rule may indicate the EASDF not to send a DNS response message corresponding to an FQDN range and/or an EAS IP address range for a DNAI.

18. The EASDF sends the Neasdf_DNSContext_Update response.

19. The EASDF sends a DNS response to the UE.

In the EAS discovery procedure, the UE sends the DNS query message to the EASDF. The DNS query message is sent to the EASDF network element through a user plane, and the EASDF determines to send the DNS message to a DNS service (local DNS server (L-DNS for short) or center DNS server (C-DNS for short)).

Figure 4:
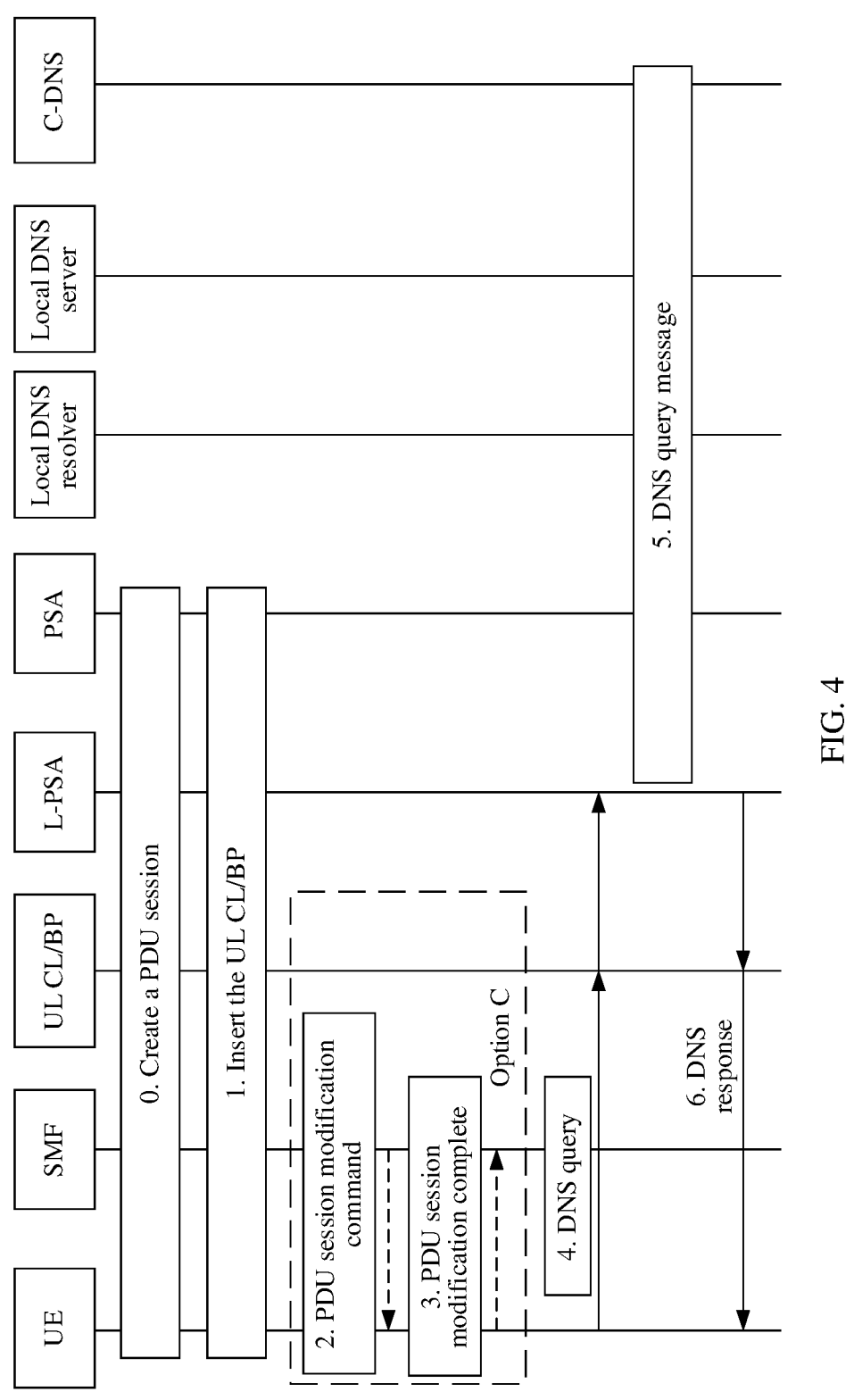
FIG. 4 is a schematic flowchart of an information update.

B: The DNS query message sent by the UE is processed by a local or central server (local or central resolver/server). As shown in FIG. 4, a specific procedure is as follows:

1. The SMF inserts the UL CL/BP and the local PSA.

The insertion of the UL CL/BP and the local PSA may be triggered based on a DNS message. Alternatively, the SMF pre-establishes the UL CL/BP and the local PSA before the UE sends the DNS query message. The UL CL/BP and the local PSA are determined in an insertion procedure defined in TS 23.502.

During the insertion of the UL CL/BP and the local PSA, the SMF configures a method for processing the DNS query messages by the UL CL/BP:

Option C: The SMF configures a UL CL/BP service routing rule, where the routing rule may include an address of the local DNS server. In this way, the UL CL/BP routes, to the local PSA, a data packet sent by the UE to the local DN, where the data packet includes the DNS query message routed to the local DNS server.

2. If the UL CL/BP and the local PSA are inserted after the PDU session is established, the SMF sends a PDU session modification command to the UE, where the command includes the address of the local DNS server.

If the IP address of the local DNS server in the local data network needs to be notified or updated to the UE based on an operator policy or UE mobility, the SMF may send the PDU session modification command (the address of the local DNS server) to the UE.

If the local operator policy indicates that the address of the local DNS server needs to be sent to the UE, the SMF sends the address of the local DNS server by using the PDU session modification command.

3. The UE sends a PDU session modification complete message.

The UE configures the local DNS server as a DNS server for the PDU session, and the UE may send the DNS message to the local DNS server.

If the EASDF is used as the DNS server for the PDU sessions, the SMF may invoke an Neasdf_DNSContext_Delete service to delete a DNS context in the EASDF.

Steps 2 and 3 herein are only for the technical solution Option C.

4. The UE sends a DNS query message.

5. Send the DNS query message to the local DNS server in the following manner:

(a) Option C: A destination IP address of the DNS query message is the IP address of the local DNS server. The DNS query message is sent by the UL CL/BP and the local PSA to the local DNS server. The local DNS service resolves the FQDN queried by the DNS or resolves the EAS IP address through recursive query.

(b) Option D: The local PSA sends the DNS query message to the local DNS server. The local DNS server resolves the FQDN queried by the DNS or resolves the EAS IP address through recursive query. The local PSA may send the DNS query message to the local DNS server through a tunnel or an IP address replacement. If the IP address replacement is used, the SMF indicates the local PSA to change a destination IP address of the data packet to an IP address of a target DNS.

6. The local PSA receives the DNS response message from the local DNS server, and sends the DNS response message to the UL CL/BP; and the UL CL/BP sends the DNS response message to the UE.

In the EAS discovery procedure, for Option C, the UE sends the DNS query message to the local DNS server through the user plane (that is, the destination address of the DNS query message is the IP address of the local DNS server): for Option D, the UE sends the DNS query message to the EASDF through the user plane (that is, the destination address of the DNS query message is the IP address of the EASDF), where the DNS message is routed to a local DNS proxy, and the proxy changes the destination address of the DNS query message to the IP address of the local DNS server used to resolve the DNS message, and changes a source address of the DNS query message to an address of the local proxy.

In a procedure in which the UE obtains the EAS IP address through DNS query, the DNS query message is sent to the EASDF or the local DNS server through the user plane. If security protection (including encryption and integrity protection) is not performed on the DNS message, an attacker may forge the DNS message. Consequently, resources of the SMF are consumed because the EASDF frequently interacts with the SMF. Alternatively, if integrity protection is not performed on the DNS message, an attacker may modify the DNS query message to obtain an incorrect EASDF address or send the DNS query message to a malicious DNS server. Alternatively, if the DNS message is not encrypted, an attacker may obtain service information that the UE is accessing, causing user privacy leakage.

Currently, to ensure security of the PDU session, 3GPP defines a user plane security mechanism. In a process of establishing a PDU session connection between the UE and the network, an access network device may determine, based on a user plane security policy of the PDU session, whether to enable user plane security protection for an air interface, where the user plane security protection includes user plane encryption protection and integrity protection. The access network device may enable one or two or neither of the user plane encryption protection and integrity protection. To ensure DNS security, the 3GPP specification recommends using TLS or DTLS between the UE and the DNS server to protect message transmission between the UE and the DNS server.

However, if the foregoing method is used to protect security of the DNS message, the following problems exist: Whether security protection is enabled for the PDU session is determined by the radio access network device based on the user plane security policy of the PDU session. The user plane security policy is determined based on a DNN and/or slice information (for example, single network slice selection support information (S-NSSAI)) of the PDU session. The user plane security policy includes an encryption policy (including "required", "preferred", and "not needed") and an integrity protection policy (including "required", "preferred", and "not needed"). If it is determined, based on the security policy, not to enable air interface security protection for the PDU session, security of the DNS message cannot be protected based on the security protection mechanism of the PDU session. In this case, if the UE does not support to establish a secure connection to the DNS server (for example, the UE does not support a security mechanism for protecting the DNS based on the datagram transport layer security (DTLS), the transport layer security (TLS), or the hypertext transfer protocol (HTTPS)), the DNS message is transmitted in plaintext without security protection over the air interface. If the UE supports to establish the secure connection to the DNS server, how the UE obtains information required for establishing a secure connection to the corresponding EASDF is not defined.

Further, if the UE establishes a (D)TLS-based secure connection to the EASDF server, when the SMF activates a discovery mechanism for Option D, because security is established between the UE and the EASDF, when the DNS proxy sends, to the local DNS server, the DNS query transmitted to the EASDF, the local DNS server cannot parse the DNS query message. As a result, the discovery procedure cannot be performed, that is, the discovery procedure fails.

Figure 5:
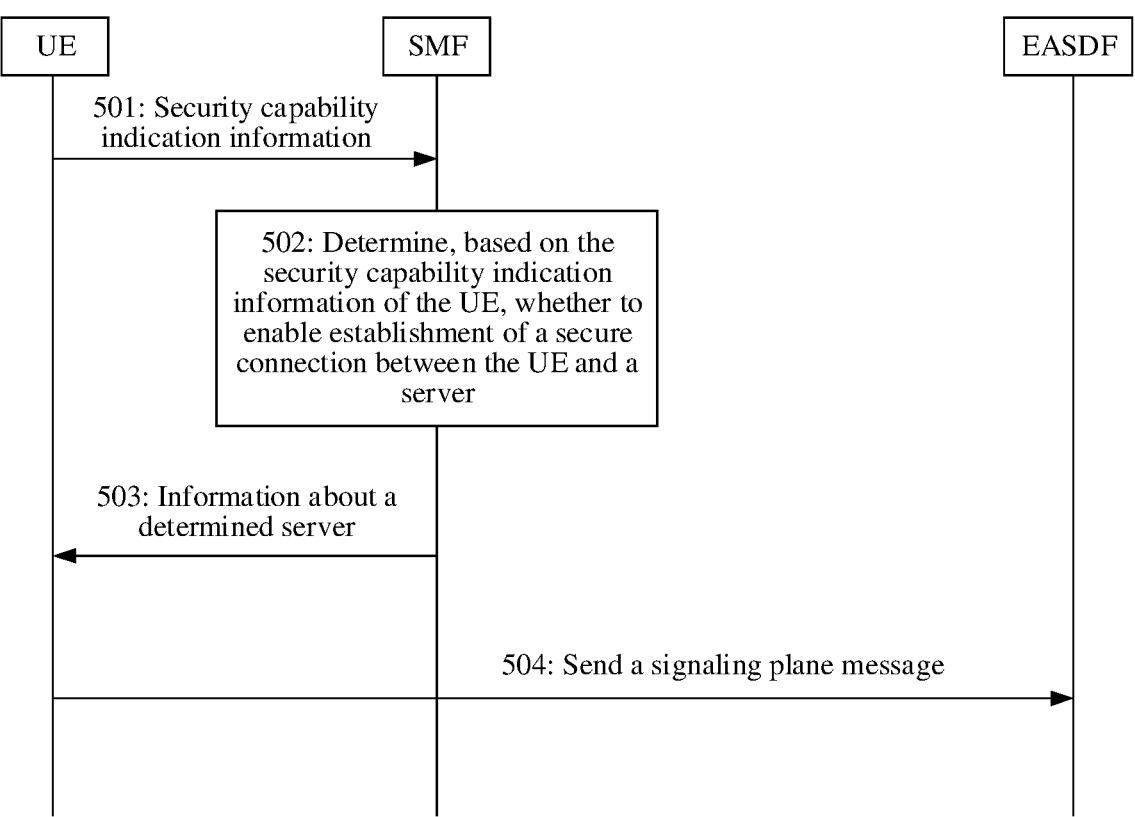
FIG. 5 is a schematic diagram of a secure communication method applicable to an embodiment of this disclosure.

To resolve the foregoing problem, this disclosure provides a secure communication method, as shown in FIG. 5.

501: A terminal device sends security capability indication information (namely, first security capability indication information) of the terminal device to an SMF, where the security capability indication information indicates that the terminal device supports or does not support to establish a secure connection to a server.

502: The SMF determines, based on the security capability indication information of the terminal device, whether to enable establishment of a secure connection between the UE and the server.

503: The SMF determines or configures a server based on the security capability indication information of the terminal device, and sends information about the determined server to the terminal.

504: The terminal device sends a signaling plane message to the determined server, for example, which may be a DNS query message, a service provision request, or an edge enabling client (EEC) registration request.

It should be understood that the SMF may further determine, based on the security capability indication information (also referred to as a security capability indication below) of the terminal device and a user plane security status (also referred to as a user plane security activation status below) of a session, whether to enable establishment of the secure connection between the terminal device and the server. The user plane security status may be indicated or may be preset. This is not limited in this disclosure. The session may be used for transmission of data between the terminal device and the server.

The SMF may further determine, based on the security capability indication of the terminal device and a user plane security policy of a session, whether to enable establishment of the secure connection between the terminal device and the server, where the user plane security policy may be indicated or may be preset. This is not limited in this disclosure. The session may be used for transmission of data between the terminal device and the server.

It should be further understood that the user plane security policy may include "enabling is required", "enabling is preferred", and "enabling is not needed". Alternatively, whether to establish the secure connection between the terminal device and the server may be determined based on the user plane security policy and the user plane security status.

In this solution, whether to establish the secure connection between the terminal device and the server is determined by comprehensively considering a security capability of the terminal device, the user plane security status of the PDU session, and/or the user plane security policy of the PDU session. This can ensure security protection for information exchange, and avoid message tampering or leakage. In addition, security between the terminal device and the server can be enabled or activated as required, to reduce power consumption and shorten a time of message exchange and service access between the terminal device and the server.

It should be understood that, in 501, a terminal device that can support the secure connection may include "supported" information or include indication information of a supported "security mechanism" in a PDU session establishment request, where the security mechanism is used to establish the secure connection; and a terminal device that does not support the secure connection may include "not supported" information or not include information about whether the secure connection is supported in a PDU session establishment request. If the SMF does not receive the indication information, the SMF may consider by default that the terminal device does not support the secure connection (for example, DNS security).

It should be further understood that, in this disclosure, the security capability of the terminal device may be a security mechanism or a security protocol that supports or does not support to establish the secure connection between the terminal device and the server, for example, the datagram transport layer security (DTLS), the transport layer security (TLS), or the hypertext transfer protocol (HTTPS). The secure connection may be a communication connection based on the foregoing security mechanism or security protocol.

If the server is a DNS server or an EASDF network element, the security capability indication in this disclosure may be one or more of an indication indicating to support to protect a DNS based on TLS, an indication indicating to support to protect a DNS based on DTLS, and an indication indicating to support to protect a DNS based on HTTPS.

Usually, the terminal device supports, by default, to enable security for an air interface.

The following describes the method according to this disclosure by using an example in which UE is a terminal device, an example in which an SMF is a session management function network element, an example in which an NRF is a network repository function network element, an example in which a UPF is a user plane function network element, an example in which an EASDF is a server, and an example in which (D)TLS is a security mechanism between a terminal device and a server.

Based on the embodiment shown in FIG. 5, this disclosure provides a possible implementation. Specifically, whether to enable security protection between the UE and the EASDF may be determined based on a DNS security capability of the UE (that is, an example of the first security capability indication information) and a user plane security activation status of a PDU session.

Details are shown in FIG. 6(*a*).

601: UE sends a PDU session establishment request to an SMF, and if the UE supports a DNS over (D)TLS (that is, supports DNS over (D)TLS), that is, the UE supports to establish (D)TLS with a DNS server to protect a DNS message, the UE may include a DNS security capability in the PDU session establishment request.

For example, the indication may be carried in a protocol extension configuration option.

The DNS security capability may also be referred to as a DNS server security information indication, and the DNS security capability may indicate a security mechanism or a security protocol supported by the UE to protect a DNS service. Alternatively, the DNS security capability may be used to obtain security information, and the security information is used to establish a secure connection between the UE and the server. Further, the SMF interacts with another core network element (for example, interacts with a UDM, a PCF, or a UPF) to perform a PDU session establishment procedure. The establishment procedure is similar to that described above. Details are not described herein again.

602: The SMF sends a PDU session establishment accept message to the UE.

603: After the SMF receives a session modification (SM) context update message from an AMF (the figure does not show a procedure in which after the UE receives the PDU session establishment accept message, the UE sends information to a RAN, the RAN sends an N2 message to an AMF, and the AMF sends a message to the SMF. For the procedure, refer to section 4.3.2 in TS23.502), details are as follows:

If a PDU session requires an EASDF, details are as follows:

(a) The DNS security capability of the UE indicates that a DNS security mechanism ((D)TLS) is supported. Different EASDFs with DNS security capabilities are deployed in a network to support different requirements (that is, EASDFs that do not support secure connection establishment negotiation, that is, all UEs that communicate with the EASDFs either establish secure connections to the EASDFs or do not establish secure connections to the EASDFs).

If security protection (including encryption protection and/or integrity protection) needs to be performed on the DNS message, the SMF may obtain a user plane security activation status of the PDU session. When the user plane security activation status of the PDU session indicates that security protection is enabled (encryption and/or integrity protection are/is enabled), the SMF selects an EASDF that does not support a DNS security capability or the SMF selects an EASDF that supports not to activate DNS security protection. When the user plane activation status of the PDU session indicates that security protection is disabled, the SMF selects an EASDF corresponding to the DNS security capability of the UE.

In other words, when a user plane security status of the PDU session does not meet a security protection requirement of the DNS message, that is, when the user plane status of the PDU session is inactive or security is not enabled, the SMF selects an EASDF corresponding to the DNS security capability supported by the UE.

The SMF may obtain a PDU user plane security activation status by using indication information of the RAN.

Figure 7:
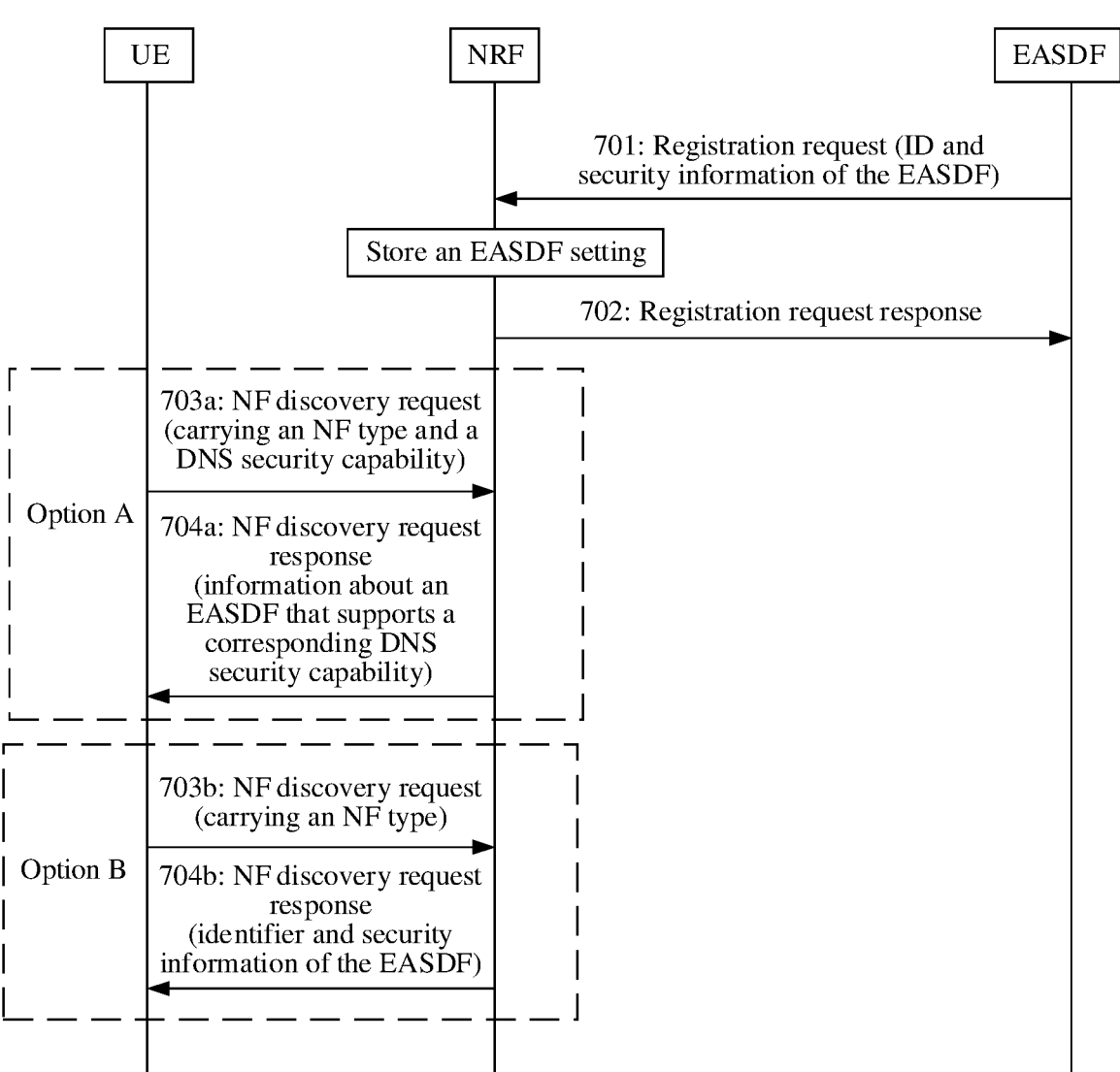
FIG. 7 is a schematic diagram of a server discovery method applicable to an embodiment of this disclosure.

A specific procedure of selecting an EASDF by the SMF may be shown in FIG. 7.

701: The EASDF sends a registration request to an NRF, where the request may include an ID of an EASDF instance and DNS security capability information of the EASDF.

If the DNS security capability information indicates that establishment of DNS security protection is supported, the DNS security capability information may include DNS security information of the EASDF, where the DNS security information of the EASDF may indicate information used to establish a secure connection between UE and the EASDF, which is briefly referred to as EASDF security information, and the information needs to be sent to the UE. For example, the EASDF security information may include information such as a credential for verifying the EASDF, a security protocol supported by the EASDF, a security mechanism supported by the EASDF, and a port number of the EASDF. The registration request may further include S-NSSAI, a DNN, an N6 IP address of the EASDF, an IP address or an IP prefix of the EASDF, an FQDN, and/or the like.

The security mechanism of the EASDF indicates a security mechanism supported for establishing the secure connection to the UE, for example, a certificate mechanism, an AKMA mechanism, or a shared key mechanism. For example, if the secure connection between the UE and the EASDF may be based on the certificate mechanism, the EASDF security information may include a credential for verifying the EASDF server, for example, root certificate information.

The security protocol of the EASDF indicates a security protocol supported for establishing the secure connection to the UE, for example, TLS, DTLS, or HTTPS. The security protocol and the security mechanism of the EASDF may be used in combination to enable establishment of the secure connection between the UE and the EASDF to protect a transmitted DNS message. It should be understood that the security protocol and the security mechanism of the EASDF may be separately indicated by using independent indications, or may be simultaneously indicated by using a same indication. This is not limited in this disclosure.

The registration request may further include other information defined in section 6.2.6.2 in TS23.501. A service-oriented message corresponding to the registration request may be Nnrf_NFmanagement_NFRegister_request.

702: The NRF stores an EASDF configuration, and sends a registration response message to the EASDF, where a service-oriented message corresponding to the registration response message may be Nnrf_NFmanagement_NFRegister_response.

In the foregoing step, the EASDF configuration may also be implemented in a preconfiguration manner. The foregoing description is merely a feasible implementation, and is not limited.

In a PDU session establishment or modification procedure, the SMF performs an EASDF discovery and selection procedure when the EASDF is required. The SMF may perform EASDF discovery and selection through the NRF. Specifically, the following two manners may be included.

Option A:

703a: The SMF sends an NF discovery request to the NRF, where the request includes an NF type, and in this case, the NF type is the EASDF: the request may further include a security indication, and the security indication is used by the NRF to discover an EASDF instance corresponding to the security indication; and A service-oriented message corresponding to the NF discovery request may be Nnrf_NFDiscovery_Request.

The security indication may indicate that establishment of a DNS secure connection to the UE is supported, or indicate that (D)TLS is supported, or indicate that (D)TLS with the UE is supported to protect a DNS message.

The security indication may be generated by the SMF based on the DNS security capability of the UE, or the security indication is the DNS security capability of the UE.

704a: The NRF sends an NF discovery response to the SMF, where the response may include information about a discovered EASDF, for example, an identifier of the EASDF, an IP address or an IP prefix of the EASDF, and/or security information.

A service-oriented message corresponding to the NF discovery response may be Nnrf_NFDiscovery_Request, and the security information may include information used by the UE to establish the secure connection, such as a security mechanism and/or a credential for verifying the EASDF. The NRF determines and selects an EASDF instance based on the NF type, and can determine, based on the NF type and the security indication, an EASDF instance corresponding to the security indication. If the response message does not include the IP address or the IP prefix of the EASDF, after receiving the identifier of the EASDF, the SMF obtains the IP address or the IP prefix of the EASDF from an EASDF or IP address resolution network element based on the identifier of the EASDF. The IP address resolution network element may be understood as a network element that obtains, based on identification information, an IP address or prefix corresponding to the identification information.

Option B:

703b: The SMF sends an NF discovery request to the NRF, where the request may include an NF type, and in this case, the NF type is the EASDF; and a service-oriented message corresponding to the NF discovery request may be Nnrf_NFDiscovery_Request.

704b: The NRF sends an NF discovery response to the SMF, where the response may include an EASDF identifier, and optionally further includes DNS security capability information or DNS security information of the EASDF.

The DNS security capability information of the EASDF indicates that the EASDF supports to establish a DNS security connection or supports to dynamically activate establishment of a DNS security connection (that is, supports to activate or supports not to activate the DNS security connection).

The DNS security information may indicate information used to establish the security connection between the UE and the EASDF. The SMF may determine EASDF security information based on the DNS security information. For example, the SMF may determine the EASDF security information corresponding to the DNS security information. For example, the DNS security information indicates a security mechanism. Correspondingly, the EASDF security information may be security information indicating the security mechanism, or the EASDF security information may include indication information of the security mechanism. The EASDF security information needs to be sent to the UE.

For example, the EASDF security information may include information such as a credential for verifying the EASDF, a security protocol supported by the EASDF, a security mechanism supported by the EASDF, and/or a port number of the EASDF. A service-oriented message corresponding to the NF discovery response may be Nnrf_NFDiscovery_Response.

It may be understood that if the response includes DNS security information, the SMF can learn, based on the DNS security information, that the EASDF supports to establish the DNS security connection. Therefore, both the DNS security capability information and the DNS security information of the EASDF may be considered as an example of a second security capability indication.

(b) The DNS security capability of the UE indicates that a DNS security mechanism is supported. An EASDF deployed in a network supports to dynamically enable or disable (or dynamically activate or not to activate) establishment of the secure connection (that is, establishes DNS secure connections to some UEs, and may not establish DNS secure connections to the other UEs, that is, the EASDF and the UE may establish or not establish the secure connection).

The information that the EASDF supports to dynamically enable or disable the security mechanism is from a local configuration of the SMF, an indication of the NRF, or an indication of the EASDF. This is not limited in this disclosure.

If security protection (encryption protection and/or integrity protection) needs to be performed on the DNS message, the SMF may obtain the user plane security activation status of the PDU session.

When the user plane security activation status of the PDU session indicates that security protection is enabled, the SMF does not send security information of the EASDF to the UE. Optionally, the SMF configures, for the EASDF, not to activate application layer security protection with the UE.

When the user plane security activation status of the PDU session indicates that security protection is not enabled, the SMF sends security information of the EASDF to the UE. Optionally, the SMF may indicate the EASDF network element to configure to activate DNS security for the UE.

604: The SMF sends an Neasdf_DNSContext_Create request to the EASDF, where the request may include a UE IP address, a callback uniform resource identifier (URI), and a rule for processing a DNS message from the UE (that is, a DNS message handling rule). The EASDF creates a DNS context for the PDU session, for example, stores the UE IP address, the callback URI, and the DNS message handling rule.

The request message may further include DNS security requirement indication information, indicating whether DNS security protection is enabled for the UE, that is, indicating whether security protection is enabled for a DNS message exchanged with the UE. The security protection is end-to-end security protection for a message exchanged between the UE and the EASDF. The security protection may further include: The UE performs, based on a security context established between the UE and the EASDF, security protection on a DNS message sent to the EASDF, and the EASDF performs, based on the security context established between the EASDF and the UE, security protection on a DNS message sent to the UE.

Optionally, the indication information further indicates a security mechanism, for example, a certificate mechanism or an AKMA mechanism, for establishing a connection for protecting the DNS message.

605: The EASDF sends an Neasdf_DNSContext_Create response to the SMF, where the response may include an IP address of the EASDF and information used by the SMF to subsequently update or delete a context, for example, an EASDF context identifier. For Option b, optionally, if the DNS security requirement indication information in step 604 indicates to enable DNS security protection, the response message may include EASDF security information. The security information is information used to establish a secure connection to the EASDF, for example, credential information of the EASDF. The credential information may be a root certificate. The security information may further include a supported security protocol, a supported security mechanism, a supported verification credential, a supported port number, and/or the like.

Optionally, the EASDF security information may be obtained in a discovery procedure, or may be preconfigured on the SMF, or may be obtained from the EASDF during interaction between the SMF and the EASDF. This is not limited in this disclosure.

It should be understood that, in this disclosure, during obtaining of the identifier and the security information of the server, the identifier and the security information of the server may be obtained at the same time, or may be obtained in a same procedure, for example, in a discovery procedure, or may be obtained sequentially in a time sequence, or may be obtained in different information obtaining procedures. This is not limited in this disclosure.

For example, both the EASDF security information and the identifier of the EASDF may be obtained in the discovery procedure, or the identifier of the EASDF, for example, an instance identifier of the EASDF, may be first obtained in the discovery procedure, and then the security information of the EASDF, for example, credential information, is obtained from the EASDF based on the instance identifier of the EASDF.

606: The SMF sends a PDU session modification command message to the UE, where the message may include the IP address of the EASDF. Further, when the SMF determines that security protection needs to be performed on the DNS message between the UE and the EASDF, the command message may further include the EASDF security information.

Optionally, the EASDF security information may be included in an extended protocol extension configuration option.

607: The UE sends a PDU session modification command complete message to the SMF.

608: When the secure connection between the UE and the EASDF needs to be established, the UE establishes the secure connection to the EASDF based on the EASDF security information. The UE sends a DNS query message to the EASDF. The EASDF receives an EASDF message from the UE and processes a DNS message data packet.

The following procedure is similar to the foregoing procedure. Details are not described herein again.

Optionally, when the user plane security activation status of the PDU session is active, the SMF may further determine, based on a service requirement, not to enable security protection between the UE and the EASDF. For example, if such a service latency requirement is strict, security protection between the UE and the EASDF may not be enabled.

Figures 6A, 6B:
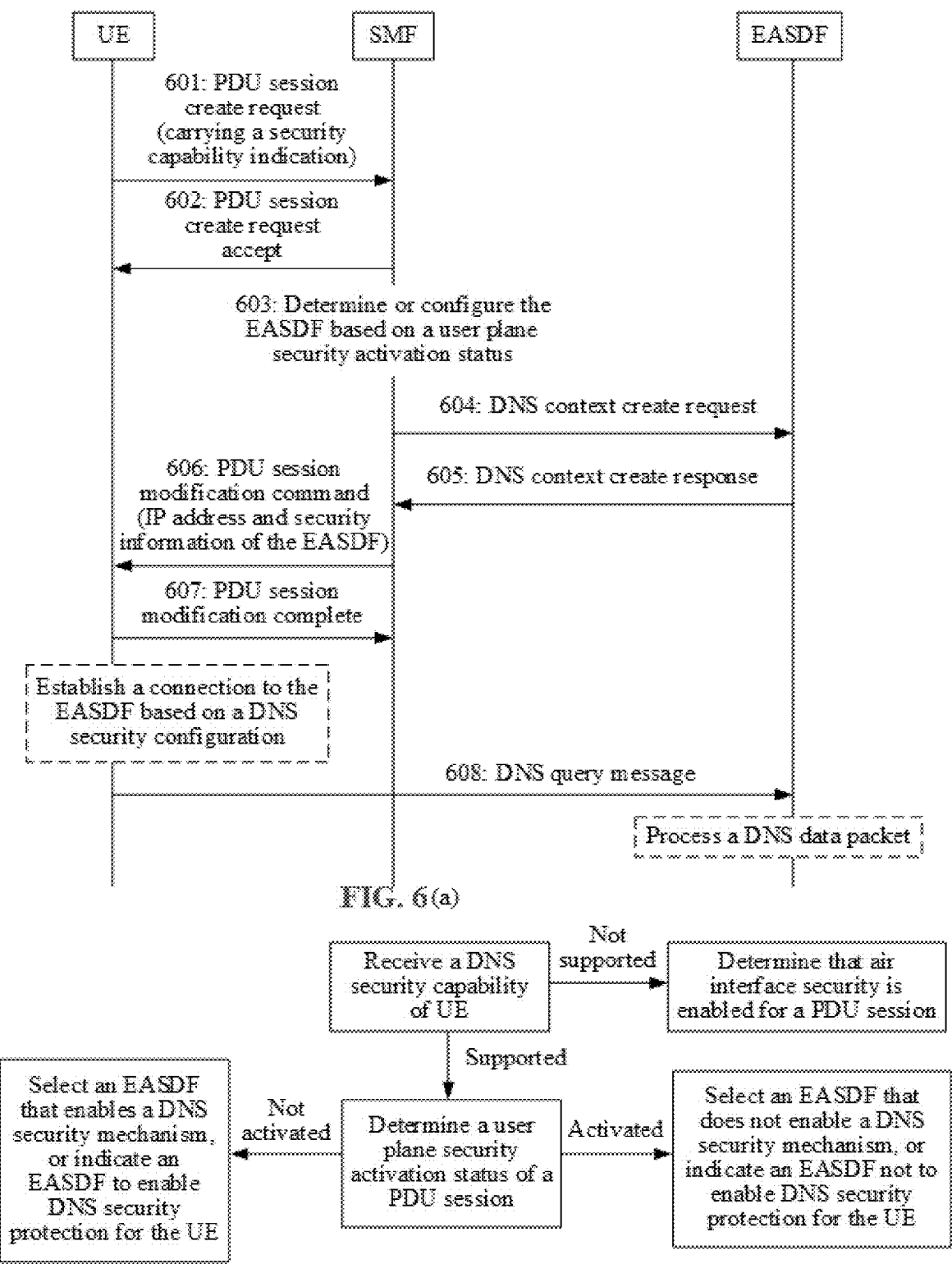
FIG. 6(*a*) and FIG. 6(*b*) are a schematic diagrams of a secure communication method applicable to an embodiment of this disclosure.

It should be understood that, for determining logic of the SMF in FIG. 6(a), refer to a logical diagram shown in FIG. 6(b). In this embodiment, when the DNS security capability of the UE supports to enable DNS security protection, the SMF determines, based on the user plane security activation status of the PDU session, whether DNS security between the UE and the EASDF is enabled, so that DNS security protection between the UE and the EASDF can be enabled as required, to ensure that the DNS message is protected and avoid tampering or leakage.

Figures 8A, 8B:
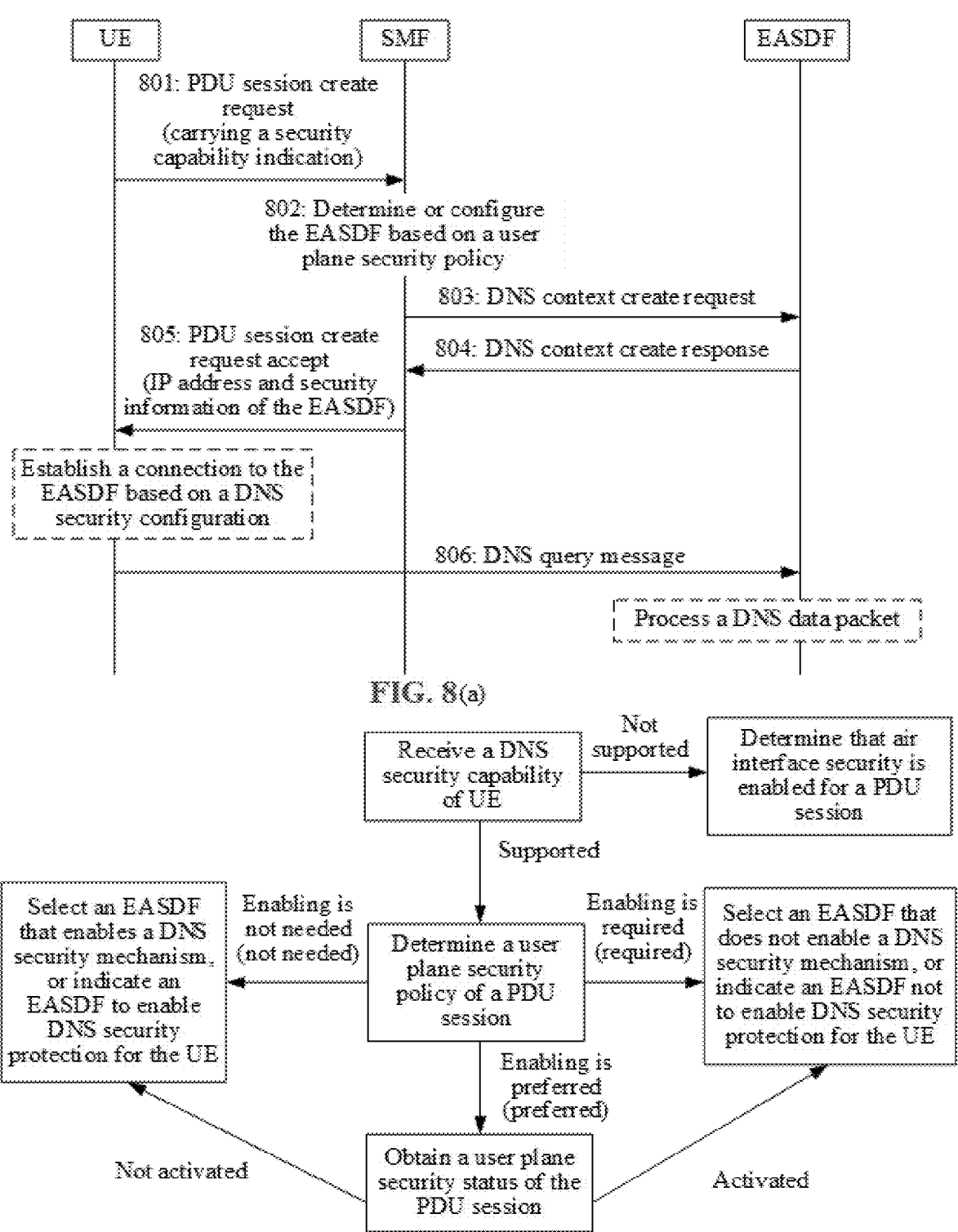
FIG. 8(*a*) and FIG. 8(*b*) are a schematic diagram of a secure communication method according to an embodiment of this disclosure.

Based on the embodiment shown in FIG. 5, this disclosure provides a possible implementation. Specifically, whether to enable security protection between the UE and the EASDF may be determined based on a DNS security capability of the UE and user plane policy information of a PDU session. Details are shown in FIG. 8(a).

801: UE sends a PDU session establishment request to an SMF, and if the UE supports a DNS over (D)TLS (that is, supports DNS over (D)TLS), the UE supports to establish (D)TLS with a DNS server to protect a DNS message, where a DNS security capability is carried in the PDU session establishment request.

Specifically, the indication may be carried in a protocol extension configuration option.

The DNS security capability may also be referred to as a DNS server security information indication, indicating a security mechanism supported by the UE to protect a DNS service. Alternatively, the SMF may obtain security information based on the DNS security capability. For example, if the DNS security capability indicates that the UE supports to establish (D)TLS, the SMF obtains security information that may include security mechanism indication information of (D)TLS. The security information is used to establish a secure connection between the UE and the server for DNS protection. The security information corresponds to a supported security mechanism or security protocol, that is, security information required when the secure connection is established by using the supported security mechanism or security protocol.

Further, the SMF interacts with another core network element (for example, interacts with a UDM, a PCF, or a UPF) to perform a PDU session establishment procedure. The procedure is similar to the foregoing procedure. Details are not described herein again.

802: The SMF obtains user plane security policy information of a PDU session, and when the SMF determines that the PDU session requires an EASDF, details are as follows:

(a) The DNS security capability of the UE indicates that a DNS security mechanism is supported. Different EASDFs with DNS security capabilities are deployed in a network to support different requirements (that is, EASDFs that do not support secure connection establishment negotiation, that is, all UEs that communicate with the EASDFs either establish secure connections to the EASDFs or do not establish secure connections to the EASDFs).

If security protection (including encryption protection and/or integrity protection) needs to be performed on the DNS message, when the user plane security policy of the PDU session indicates that enabling of security protection is required (including that encryption and/or integrity protection are/is enabled), the SMF selects an EASDF that does not support a DNS security capability or the SMF selects an EASDF that supports not to activate DNS security protection. When the user plane security policy of the PDU session indicates that security protection is not needed, the SMF selects an EASDF corresponding to the DNS security capability of the UE. If the user plane security policy of the PDU session indicates that security protection is preferred, the SMF waits for a final user plane security activation status sent by the RAN to select an EASDF.

In other words, when a user plane security status of the PDU session does not meet a security protection requirement of the DNS message, the SMF selects an EASDF corresponding to the DNS security capability supported by the UE.

Figure 9:
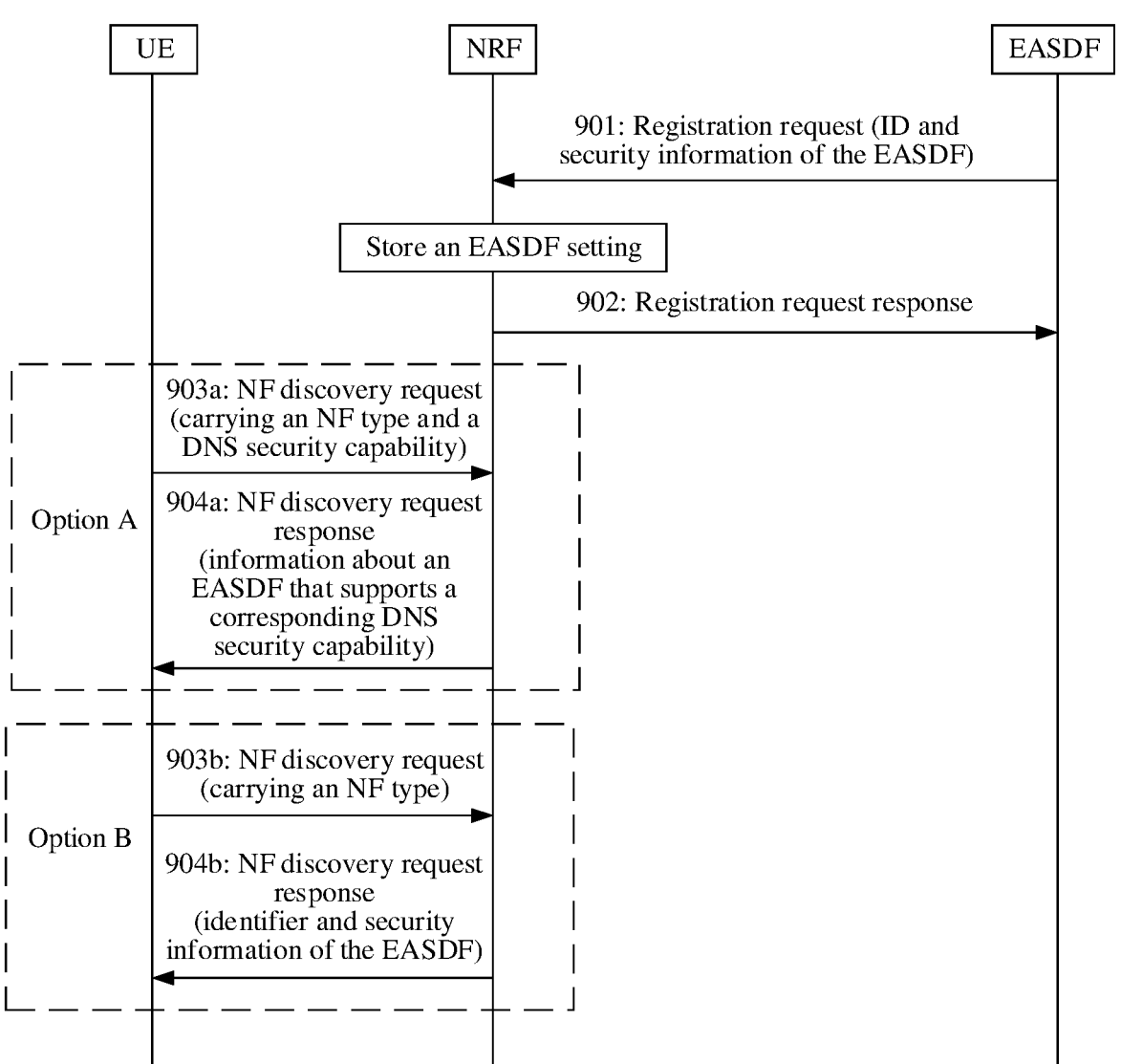
FIG. 9 is a schematic diagram of a server discovery method applicable to an embodiment of this disclosure.

For example, a specific procedure of selecting an EASDF by the SMF may be shown in FIG. 9.

901: An EASDF sends a registration request to an NRF, where the request may include an instance ID of the EASDF. If DNS security capability information indicates that establishment of DNS security protection is supported, the registration request may further include DNS security information of the EASDF, where the DNS security information of the EASDF may indicate information used to establish a secure connection between UE and the EASDF, which is briefly referred to as EASDF security information, and a part or all of the information needs to be sent to the UE. For example, the EASDF security information may include information such as a credential for verifying the EASDF, a security protocol supported by the EASDF, a security mechanism supported by the EASDF, and/or a port number of the EASDF. The registration request may further include S-NSSAI, a DNN, an N6 IP address of the EASDF, an IP address or an IP prefix of the EASDF, an FQDN, and/or the like.

The security mechanism of the EASDF (an example of second security indication information) indicates a security mechanism supported for establishing the secure connection to the UE, for example, a certificate mechanism or an AKMA mechanism. For example, if the secure connection between the UE and the EASDF may be based on the certificate mechanism, the EASDF security information may further include a credential for verifying the EASDF server, for example, root certificate information.

The security protocol of the EASDF indicates a security protocol supported for establishing the secure connection to the UE, for example, TLS, DTLS, or HTTPS. The security protocol and the security mechanism of the EASDF may be used in combination to enable establishment of the secure connection between the UE and the EASDF to protect a transmitted DNS message. Alternatively, the security protocol and the security mechanism of the EASDF may be separately indicated by using independent indications, or the two capabilities are simultaneously indicated by using a same indication.

An example in which the two capabilities are simultaneously indicated by using the same indication may indicate that certificate-based TLS is supported, AKMA-based TLS is supported, or the like. The security mechanism, for example, a certificate-based security mechanism, and the security protocol, for example, TLS, may be reflected in the same indication.

The request may further include other information defined in section 6.2.6.2 in TS23.501. A service-oriented message corresponding to the registration request may be Nnrf_NF-management_NFRegister_request.

902: The NRF stores an EASDF configuration, and sends a registration response message to the EASDF, where a service-oriented message corresponding to the registration response message may be Nnrf_NFmanagement_NFRegister_response.

In the foregoing step, the EASDF configuration may also be implemented in a preconfiguration manner. The foregoing description is merely used as a feasible implementation, and is not limited.

In a PDU session establishment or modification procedure, the SMF performs an EASDF discovery and selection procedure when the EASDF is required. When the NRF is used to perform EASDF discovery and selection, a specific manner may include the following two possibilities.

Option A:

903a: The SMF sends an NF discovery request to the NRF, where the request may include an NF type, and in this case, the NF type is the EASDF: the request may further include a security indication, and the security indication is used by the NRF to discover an EASDF instance corresponding to the security indication; and a service-oriented message corresponding to the NF discovery request may be Nnrf_NFDiscovery_Request. The security indication indicates that establishment of a DNS secure connection to the UE is supported, or indicates that (D)TLS is supported, or indicates that (D)TLS with the UE is supported to protect a DNS message.

904a: The NRF sends an NF discovery response to the SMF, where the response may include EASDF information, for example, an identifier of the EASDF, an IP address or an IP prefix of the EASDF, or security information. A service-oriented message corresponding to the NF discovery response may be Nnrf_NFDiscovery_Request, and the security information may include information used by the UE to establish the secure connection, such as a security mechanism and/or a credential for verifying the EASDF. The NRF determines and selects an EASDF instance based on the NF type, and can determine, based on the security indication, an EASDF instance corresponding to the security indication.

If the response message does not include the IP address or the IP prefix of the EASDF, after receiving the identifier of the EASDF, the SMF can obtain the IP address or the IP prefix of the EASDF from the EASDF or an IP address resolution network element based on the identifier of the EASDF. The IP address resolution network element may be understood as a network element that obtains, based on identification information, an IP address or prefix corresponding to the identifier.

Option B:

903*b*: The SMF sends an NF discovery request to the NRF, where the request may include an NF type, and in this case, the NF type is the EASDF; and a service-oriented message corresponding to the NF discovery request may be Nnrf_NFDiscovery_Request.

904*b*: The NRF sends an NF discovery response to the SMF, where the response may include an EASDF identifier, and optionally further includes DNS security capability information or DNS security information of the EASDF. The DNS security information may include information used to establish a security connection between the UE and the EASDF. The EASDF security information may be determined based on the DNS security information, and the EASDF security information needs to be sent to the UE. For example, the EASDF security information may include information such as a credential for verifying the EASDF, a security protocol supported by the EASDF, a security mechanism supported by the EASDF, and/or a port number of the EASDF. A service-oriented message corresponding to the NF discovery response may be Nnrf_NFDiscovery_Response.

(b) The DNS security capability of the UE indicates that a DNS security mechanism is supported. A deployed EASDF supports to dynamically enable or disable establishment of the secure connection (that is, establishes DNS secure connections to some UEs, and does not establish DNS secure connections to the other UEs). The information that the EASDF supports to dynamically enable or disable the security mechanism is from a local configuration of the SMF, an indication of the NRF, or an indication of the EASDF. This is not limited in this disclosure.

If security protection (encryption protection and/or integrity protection) needs to be performed on the DNS message, details are as follows:

When the user plane security policy of the PDU session indicates that enabling of security protection is required, the SMF does not send security information of the EASDF to the UE. Optionally, the SMF configures, for the EASDF, not to activate application layer security protection with the UE.

When the user plane security policy of the PDU session indicates that enabling of security protection is not needed, the SMF sends security information of the EASDF to the UE. Optionally, the SMF may indicate the EASDF network element to configure and activate DNS security for the UE.

If the user plane security policy of the PDU session indicates that enabling of security protection is preferred, the SMF skips EASDF selection. When obtaining a user plane security activation status, the SMF configures, based on the user plane security activation status, whether user plane security protection between the UE and the EASDF is enabled. A specific method is similar to the foregoing implementation. Details are not described herein again.

803: The SMF sends an Neasdf_DNSContext_Create request to the EASDF, where the request may include a UE IP address, a uniform resource identifier, and a rule for processing a DNS message from the UE (that is, a DNS message handling rule). The EASDF creates a DNS context for the PDU session, for example, stores the UE IP address, the callback URI, and the DNS message handling rule. The request message may further include DNS security enabling indication information, indicating whether DNS security protection is enabled for the UE. Optionally, the indication information may further indicate a security protection mechanism of the DNS message.

804: The SMF sends an Neasdf_DNSContext_Create response to the EASDF, where the response may include an IP address of the EASDF and information used by the SMF to subsequently update or delete a context. For Option b, optionally, if the DNS security enabling indication information indicates to enable DNS security, the response message in step 904*a* and/or 904*b* may include EASDF security information. The security information is security information used to establish a secure connection to the EASDF, for example, credential information of the EASDF. The credential information may be a root certificate.

Optionally, the EASDF security information may be obtained in a discovery procedure, or may be preconfigured on the SMF, or may be obtained from the EASDF during interaction between the SMF and the EASDF. This is not limited in this disclosure.

805: The SMF sends a PDU session create request accept message to the UE, where the message may include the IP address of the EASDF. Further, when the SMF determines that security protection needs to be performed on the DNS message between the UE and the EASDF, the message may further include the EASDF security information. The EASDF security information may be included in an extended protocol extension configuration option.

806: When the secure connection between the UE and the EASDF needs to be established, the UE establishes the secure connection to the EASDF based on the EASDF security information. The UE sends a DNS query message to the EASDF. The EASDF receives an EASDF message from the UE and processes a DNS message data packet.

The following procedure is similar to the foregoing procedure. Details are not described herein again.

It should be understood that, for determining logic of the SMF in FIG. 8(*a*), refer to a logical diagram) in FIG. 8(*b*). In this solution, when the DNS security capability of the UE supports to enable DNS security protection, the SMF determines, based on the user plane security policy of the PDU session and/or the user plane security activation status, whether DNS security between the UE and the EASDF is enabled, so that DNS security between the UE and the EASDF can be enabled as required, to ensure security of the DNS message, avoid tampering or leakage, and improve service access efficiency.

Based on the embodiment shown in FIG. 5, this disclosure provides another possible implementation. When the UE does not support to establish (D)TLS with the DNS server to protect the DNS message, the SMF may set a user plane security policy of a PDU session, to ensure security protection for the DNS message.

Figure 10:
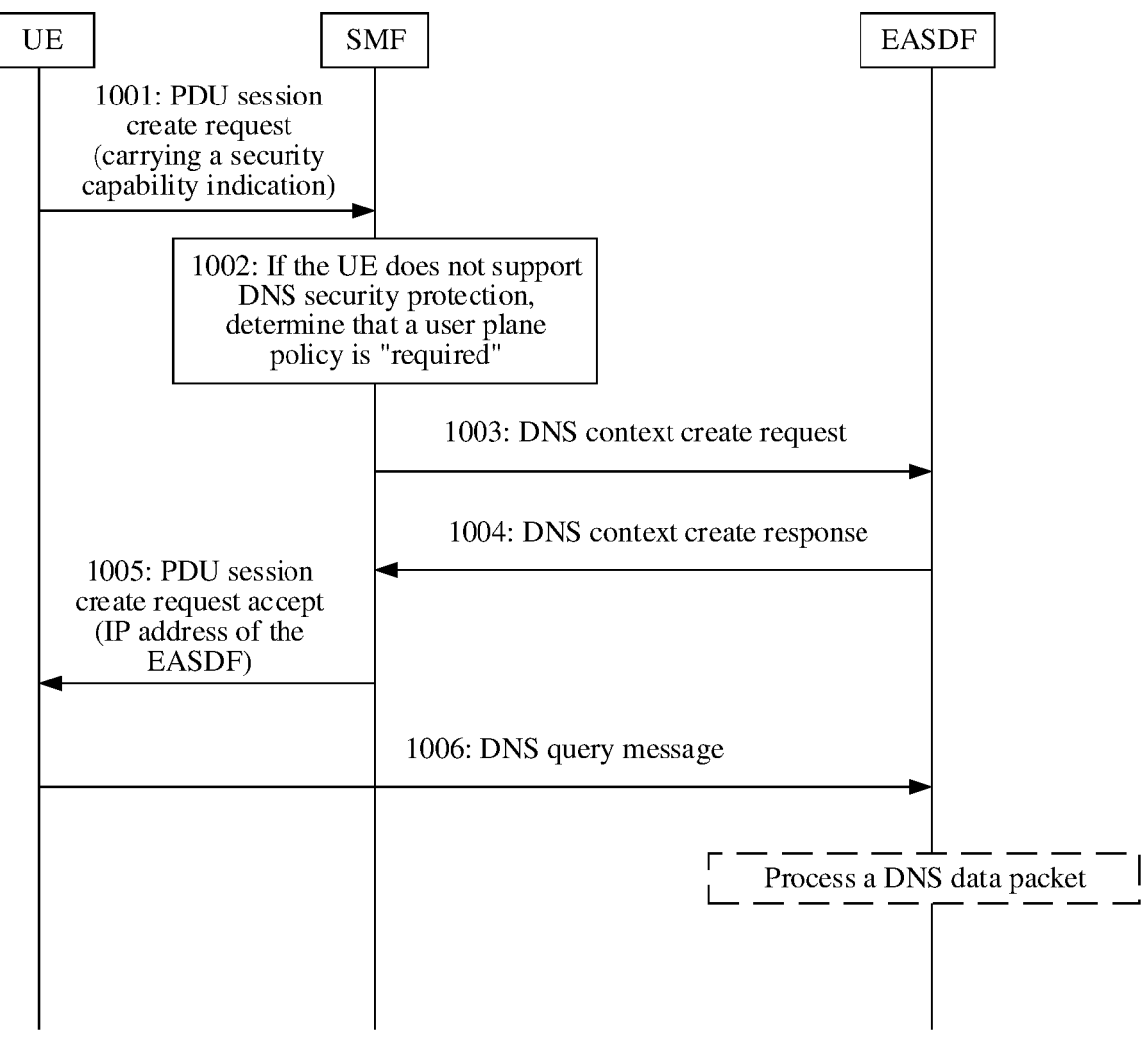
FIG. 10 is a schematic diagram of another secure communication method applicable to an embodiment of this disclosure.

Specifically, as shown in FIG. 10, details are as follows:

1001: UE sends a PDU session establishment request to an SMF, and if the UE does not support to establish a secure connection to an EASDF, that is, the UE does not support to establish (D)TLS with a DNS server to protect a DNS message, the UE does not include a DNS security capability in the PDU session establishment request.

It may be understood that if the PDU session establishment request does not carry a DNS security capability indication, the SMF may consider by default that the UE does not have the capability, or may include indication information in the PDU session establishment request to indicate that the UE does not have the capability. This is not limited in this disclosure.

Further, the SMF interacts with another core network element (for example, interacts with a UDM, a PCF, or a UPF) to perform a PDU session establishment procedure. The establishment procedure is similar to the foregoing procedure. Details are not described herein again.

1002: The UE does not support the DNS security capability, and when security protection needs to be performed on the DNS message, if a PDU session security policy obtained by the SMF indicates that required security protection is not needed or preferred, the SMF modifies the PDU session policy to "required". Alternatively, the SMF may directly generate a PDU session security policy to indicate that enabling of security protection is required, where the security protection may specifically include at least one of required encryption protection and required integrity protection.

(a) When different EASDFs with DNS security capabilities are deployed in a network to support different requirements (that is, EASDFs that do not support security negotiation, that is, all UEs that communicate with the EASDFs either establish secure connections to the EASDFs or do not establish secure connections to the EASDFs), the SMF selects an EASDF that does not support the DNS security capability. A specific selection manner is the same as the foregoing implementation. Details are not described herein again.

(b) If a deployed EASDF supports to dynamically enable or disable a security mechanism (that is, establishes DNS secure connections to some UEs, and does not establish DNS secure connections to the other UEs), the SMF indicates the EASDF network element to configure not to activate DNS security protection for the UE.

It should be understood that the SMF may indicate the EASDF not to activate DNS security protection, or may indicate the EASDF to disable DNS security protection, or may not send an indication. When the EASDF does not receive the indication, security protection is not activated by default. This is not limited in this disclosure.

1003: The SMF sends an Neasdf_DNSContext_Create request to the EASDF, where the request may include a UE IP address, a callback URI, and a rule for processing a DNS message from the UE (that is, a DNS message handling rule). The EASDF creates a DNS context for the PDU session, for example, stores the UE IP address, the callback URI, and the DNS message handling rule. For Option 2, the message may further include DNS security requirement indication information, indicating not to enable DNS security protection for the UE.

1004: The SMF sends an Neasdf_DNSContext_Create response to the EASDF, where the response may include an IP address of the EASDF and information used by the SMF to subsequently update or delete a context.

1005: The SMF sends a PDU session create request accept message to the UE, where the message may include the IP address of the EASDF.

1006: The UE does not need to establish a secure connection to the EASDF, and directly sends a DNS query message to the EASDF.

When the DNS security capability of the UE does not support to enable DNS security protection, the SMF determines that the user plane security policy of the PDU session is "required", protects the DNS message by using the security mechanism of the PDU session, and selects an appropriate DNS security protection method based on a capability of the UE, to ensure service access efficiency as much as possible.

Figure 11:
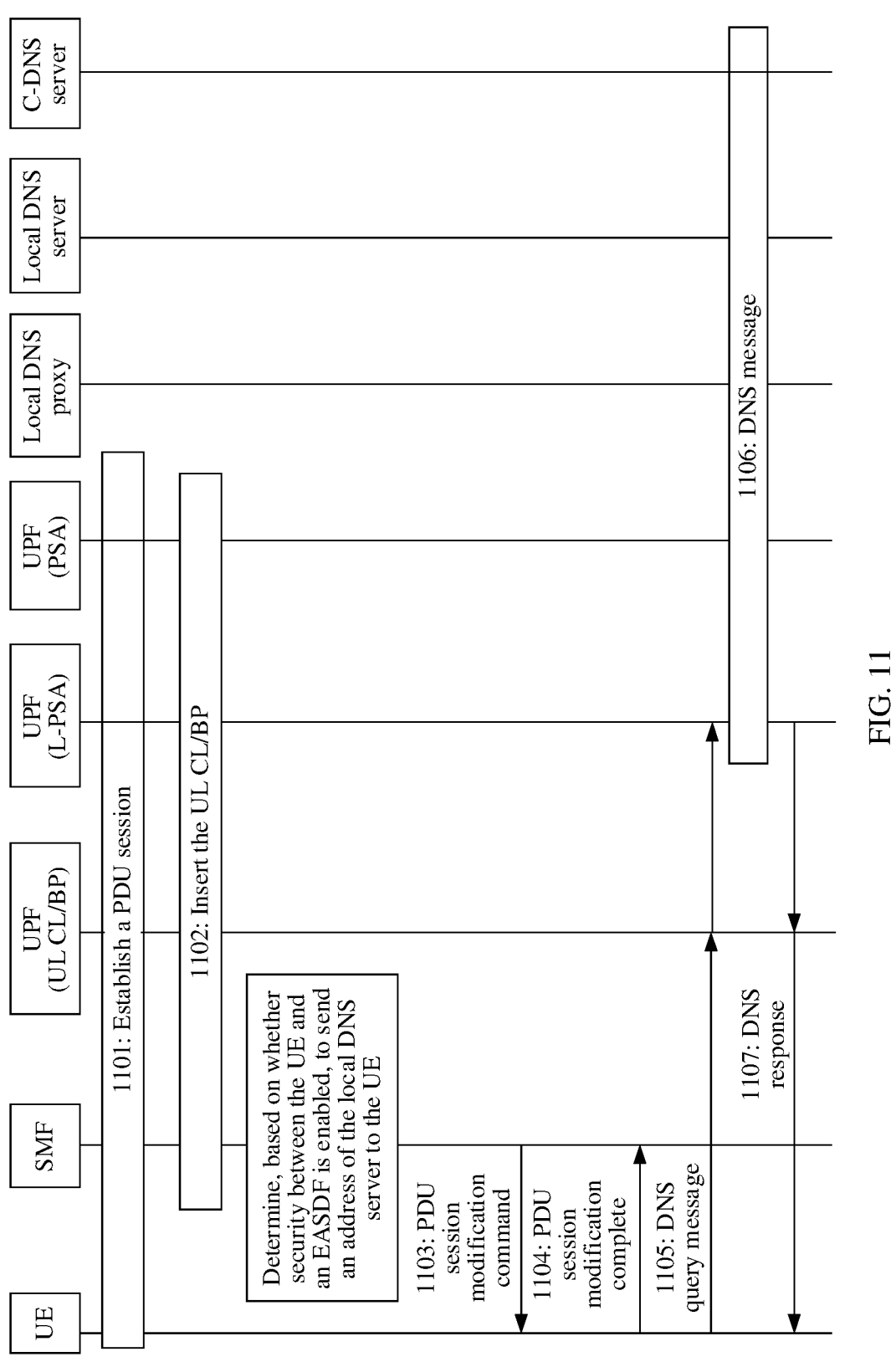
FIG. 11 is a schematic diagram of another secure communication method applicable to an embodiment of this disclosure.

In another possible implementation, when only a remote PSA is configured for a PDU session, an anchor needs to be inserted. Details are shown in FIG. 11.

1101: UE establishes a PDU session with a network, where only a remote PSA is configured for the PDU session, and an SMF sends an IP address of an EASDF serving PDU session to the UE.

1102: If the SMF determines that a UL CL/BP needs to be inserted, the SMF performs a UL CL/BP insertion procedure. Further, if the SMF determines that a DNS security protection mechanism is enabled between the UE and the EASDF, the SMF obtains an address of a local DNS server, and performs steps 2 and 3 in FIG. 4. If the DNS security protection mechanism is not enabled, the SMF may determine, based on a local policy or other information, whether to update an address of a DNS message of the UE.

Steps 1103 to 1107 are similar to steps 2 to 6 in FIG. 4. Details are not described herein again.

In this solution, when the DNS security protection mechanism is enabled between the UE and the EASDF, the address of the local DNS server is obtained and the UE is notified, so that the UE can modify a destination address of a message in a timely manner, to avoid a problem that an original server cannot parse the message after the message passes through a secure connection to the EASDF. In addition, the SMF selects a specific EAS discovery mechanism based on whether security between the UE and the EASDF is enabled, to improve EAS discovery flexibility.

Embodiments described in this specification may be independent solutions, or may be combined based on intrinsic logic. These solutions shall all fall within the protection scope of this disclosure.

In the foregoing embodiments provided in this disclosure, the methods provided in embodiments of this disclosure are separately described from a perspective of interaction between devices. To implement functions in the methods provided in the foregoing embodiments of this disclosure, the network device or the terminal device may include a hardware structure and/or a software module, and implements the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this disclosure, division into the modules is an example and is merely logical function division, and may be other division in an actual implementation. In addition, function modules in embodiments of this disclosure may be integrated into one processor, or may exist alone physically, or two or more modules may be integrated into one module. The integrated module may be implemented in a form of hardware, or may be implemented in a form of a software function module.

Figure 12:
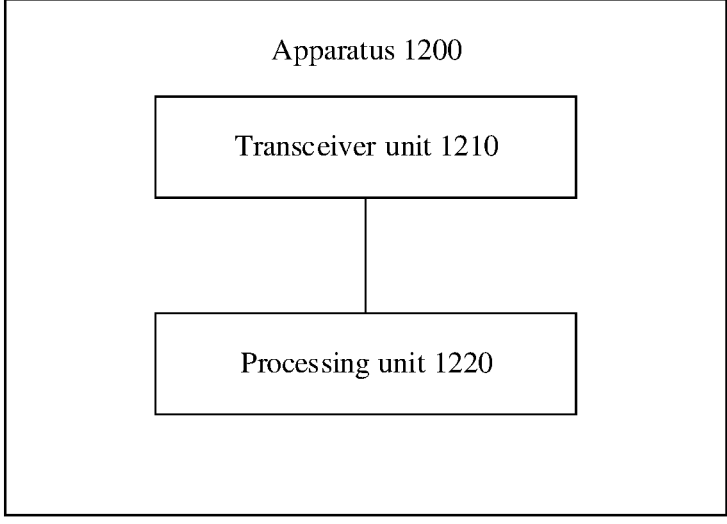
FIG. 12 is a schematic block diagram of a communication apparatus according to an embodiment of this disclosure.

Same as the foregoing concept, as shown in FIG. 12, an embodiment of this disclosure further provides an apparatus 1200, configured to implement functions of the session management function network element in the foregoing method. For example, the apparatus may be a software module or a chip system. In this embodiment of this disclosure, the chip system may include a chip, or may include a chip and another discrete component. The apparatus 1200 may include a processing unit 1210 and a communication unit 1220.

In this embodiment of this disclosure, the communication unit may also be referred to as a transceiver unit, and may include a sending unit and/or a receiving unit, which are respectively configured to perform the steps of sending and receiving by the session management function network element in the foregoing method embodiments.

Figure 13:
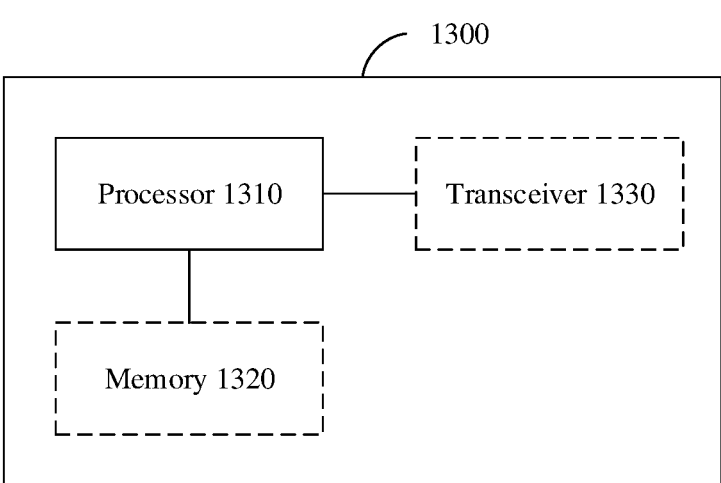
FIG. 13 is a schematic block diagram of another communication apparatus according to an embodiment of this disclosure.

The following describes, in detail with reference to FIG. 12 and FIG. 13, communication apparatuses provided in embodiments of this disclosure. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 1220 and that is configured to implement the receiving function may be considered as a receiving unit, and a component that is in the communication unit 1220 and that is configured to implement the sending function may be considered as a sending unit. That is, the communication unit 1220 includes the receiving unit and the sending unit. The communication unit sometimes may also be referred to as a transceiver machine, a transceiver, an interface circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

When the communication apparatus 1200 performs the function of the session management function network element in the procedure shown in any one of FIG. 5 to FIG. 11 in the foregoing embodiments, the processing unit is configured to determine information about a first server based on a security capability of a terminal device; and the communication unit is configured to receive/transmit information.

When the communication apparatus 1200 performs the function of the registration function network element in the procedure shown in any one of FIG. 5 to FIG. 11 in the foregoing embodiments, the processing unit is configured to determine information about a first server based on a security capability of a terminal device; and the communication unit is configured to receive/transmit information.

The foregoing descriptions are merely an example. The processing unit 1210 and the communication unit 1220 may further perform other functions. For more detailed descriptions, refer to related descriptions in the method embodiments shown in FIG. 5 to FIG. 11 or other method embodiments. Details are not described herein again.

FIG. 13 shows an apparatus 1300 according to an embodiment of this disclosure. The apparatus shown in FIG. 13 may be an implementation of a hardware circuit of the apparatus shown in FIG. 12. The communication apparatus is applicable to the flowchart shown above, and performs functions of the terminal device or the network device in the foregoing method embodiments. For ease of description, FIG. 13 shows only main components of the communication apparatus.

As shown in FIG. 13, the communication apparatus 1300 includes a processor 1310 and an interface circuit 1320. The processor 1310 and the interface circuit 1320 are coupled to each other. It may be understood that the interface circuit 1320 may be a transceiver or an input/output interface. Optionally, the communication apparatus 1300 may further include a memory 1330, configured to: store instructions executed by the processor 1310, or store input data required by the processor 1310 to run the instructions, or store data generated after the processor 1310 runs the instructions.

When the communication apparatus 1300 is configured to implement the methods shown in FIG. 5 to FIG. 11, the processor 1310 is configured to implement the function of the processing unit 1210, and the interface circuit 1320 is configured to implement the function of the communication unit 1220.

When the communication apparatus is a chip applied to a terminal device, the chip in the terminal device implements the function of the terminal device in the foregoing method embodiment. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements the function of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this disclosure may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, any conventional processor, or the like.

In embodiments of this disclosure, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in the network device or the terminal device as discrete components.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

It is clear that, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A secure communication method comprising:
receiving, by a session management function network element, first security capability indication information from a terminal device, wherein the first security capability indication information indicates that the terminal device supports establishment of a secure connection between the terminal device and a server;
determining, by the session management function network element based on the first security capability indication information, a first server that supports establishment of the secure connection; and
sending, by the session management function network element, information about the first server to the terminal device to establish the secure connection.

2. The method according to claim 1, wherein the determining, by the session management function network element based on the first security capability indication information, of the first server that supports establishment of the secure connection comprises:
in response to determining that user plane security protection is not enabled for a session of the terminal device, determining, by the session management function network element, the first server based on the first security capability indication information, wherein the session is configured for transmission of data between the terminal device and the first server.

3. The method according to claim 2, wherein the method further comprises:
determining, by the session management function network element based on a user plane security status of the session or a user plane security policy of the session, that user plane security protection is not enabled for the session.

4. The method according to claim 3, wherein the method further comprises:
receiving, by the session management function network element, indication information of the user plane security status of the session from an access network device.

5. The method according to claim 3, wherein:
the determining, by the session management function network element, that the user plane security protection is not enabled for the session is based on the user plane security status of the session; and
the user plane security status of the session is a non-activated state.

6. The method according to claim 3, wherein the method further comprises:
receiving, by the session management function network element, the user plane security policy of the session from a unified data management network element.

7. The method according to claim 3, wherein:
the determining, by the session management function network element, that the user plane security protection is not enabled for the session is based on the user plane security policy of the session; and
the user plane security policy of the session is that enabling is not needed.

8. The method according to claim 1, wherein the determining, by the session management function network element based on the first security capability indication information, of the first server that supports establishment of the secure connection comprises:
sending, by the session management function network element, a request message to a network repository function network element, wherein the request message comprises the first security capability indication information, and the request message is configured to request to discover a server that supports the secure connection; and receiving, by the session management function network element, a response message of the request message from the network repository function network element, wherein the response message comprises the information about the first server.

9. The method according to claim 1, wherein the determining, by the session management function network element based on the first security capability indication information, of the first server that supports establishment of the secure connection comprises:

sending, by the session management function network element, a request message to a network repository function network element, wherein the request message is configured to request to discover a server;

receiving, by the session management function network element, a response message of the request message from the network repository function network element, wherein the response message comprises the information about the first server and second security capability indication information, and the second security capability indication information indicates that the first server supports the secure connection or supports activation of the secure connection; and determining, by the session management function network element, the first server based on the second security capability indication information and the first security capability indication information.

10. The method according to claim 9, wherein in response to the second security capability indication information indicating that the first server supports activation of the secure connection, the method further comprises:

sending, by the session management function network element, activation indication information to the first server, wherein the activation indication information indicates the first server to activate the secure connection.

11. The method according to claim 10, wherein the method further comprises:

sending, by the session management function network element, the activation indication information to the first server based on local second security capability indication information, wherein the activation indication information indicates the first server to activate the secure connection, and the second security capability indication information indicates that the first server supports activation of the secure connection.

12. The method according to claim 1, wherein the sending, by the session management function network element, information about the first server to the terminal device to establish the secure connection comprises:

sending, by the session management function network element, a session establishment accept message to the terminal device, wherein the session establishment accept message comprises the information about the first server; or sending, by the session management function network element, a session modification command to the terminal device, wherein the session modification command comprises the information about the first server.

13. The method according to claim 1, wherein the information about the first server comprises at least one of an identifier of the first server, a security protocol supported by the first server, a security mechanism supported by the first server, a credential for verifying the first server, and a port number of the first server.

14. An apparatus, comprising a processor and a memory, wherein the memory is coupled to the processor and configured to store instructions that are executable by the processor to cause the apparatus to:

receive first security capability indication information from a terminal device, wherein the first security capability indication information indicates that the terminal device supports establishment of a secure connection between the terminal device and a server;

determine, based on the first security capability indication information, a first server that supports establishment of the secure connection; and send information about the first server to the terminal device to establish the secure connection.

15. The apparatus according to claim 14, wherein the apparatus is further caused to:

in response to determining that user plane security protection is not enabled for a session of the terminal device, determine the first server based on the first security capability indication information, wherein the session is configured for transmission of data between the terminal device and the first server.

16. The apparatus according to claim 15, wherein the apparatus is further caused to:

determine, based on a user plane security status of the session or a user plane security policy of the session, that user plane security protection is not enabled for the session.

17. The apparatus according to claim 16, wherein the apparatus is further caused to:

receive indication information of the user plane security status of the session from an access network device; or receive the user plane security policy of the session from a unified data management network element.

18. The apparatus according to claim 16, wherein the apparatus is further caused to:

determine, based on the user plane security status of the session being a non-activated state, that user plane security protection is not enabled for the session; or determine, based on the user plane security policy of the session being that enabling is not needed, that user plane security protection is not enabled for the session.

19. A non-transitory computer-readable medium, comprising instructions which are executable by an apparatus to cause the apparatus to:

receive first security capability indication information from a terminal device, wherein the first security capability indication information indicates that the terminal device supports establishment of a secure connection between the terminal device and a server;

determine, based on the first security capability indication information, a first server that supports establishment of the secure connection; and send information about the first server to the terminal device to establish the secure connection.

20. The non-transitory computer-readable medium according to claim 19, wherein the apparatus is further caused to:

in response to determining that user plane security protection is not enabled for a session of the terminal device, determine the first server based on the first security capability indication information, wherein the session is configured for transmission of data between the terminal device and the first server.

\* \* \* \* \*